(12) United States Patent
Lavrich et al.

(10) Patent No.: US 11,104,230 B2
(45) Date of Patent: Aug. 31, 2021

(54) MULTI-SOURCE POWER MANAGEMENT FOR A TRANSPORT REFRIGERATION SYSTEM

(71) Applicant: THERMO KING CORPORATION, Minneapolis, MN (US)

(72) Inventors: Philip Lewis Lavrich, Mooresville, NC (US); Robert Leslie Isaacs, Buffalo, MN (US)

(73) Assignee: Thermo King Corporation, Minneapolis, MN (US)

(*) Notice: Subject to any disclaimer, the term of this patent is extended or adjusted under 35 U.S.C. 154(b) by 181 days.

(21) Appl. No.: 16/251,976

(22) Filed: Jan. 18, 2019

(65) Prior Publication Data

US 2020/0231041 A1    Jul. 23, 2020

(51) Int. Cl.
*B60P 3/20* (2006.01)
*B60L 1/00* (2006.01)
(Continued)

(52) U.S. Cl.
CPC .......... *B60L 1/003* (2013.01); *B60H 1/00014* (2013.01); *B60H 1/00428* (2013.01);
(Continued)

(58) Field of Classification Search
CPC ............ B60H 1/00014; B60H 1/00264; B60H 1/3232; F25D 11/003; B60L 11/003
See application file for complete search history.

(56) References Cited

U.S. PATENT DOCUMENTS

| 4,553,584 A | * | 11/1985 | Bloomquist | ....... B60H 1/00014 |
| | | | | 165/263 |
| 4,903,502 A | * | 2/1990 | Hanson | ................... F25B 49/02 |
| | | | | 236/1 EA |

(Continued)

FOREIGN PATENT DOCUMENTS

| EP | 3628518 | 1/2020 |
| WO | 2008/113083 | 9/2008 |
| WO | 2018/005978 | 1/2018 |

OTHER PUBLICATIONS

Extended European Search Report, issued in the corresponding European patent application No. 19219482.7, dated Jun. 19, 2020, 8 pages.

*Primary Examiner* — Jonathan Bradford
(74) *Attorney, Agent, or Firm* — Hamre, Schumann, Mueller & Larson, P.C.

(57) ABSTRACT

A method for power management of a transport refrigeration system electrically connected to a utility power source. The method including determining an operating mode for the transport refrigeration system based on one or more of an amount of utility power available from the utility power source to the transport refrigeration system, a current cost of the utility power, and a noise or emission regulation for operating a prime mover. A transport refrigeration system unit that includes a transport refrigeration unit and a controller configured to receive power from a utility power source or a primary energy source. The controller also configured to determine an operating mode for the transport refrigeration system based on one or more of an amount of utility power available from the utility power source to the transport refrigeration system, a current cost of the utility power, and a noise or emission regulation for operating the prime mover.

18 Claims, 11 Drawing Sheets

(51) Int. Cl.
*B60H 1/00* (2006.01)
*B60H 1/32* (2006.01)

(52) U.S. Cl.
CPC ....... *B60H 1/00764* (2013.01); *B60H 1/3232* (2013.01); *B60P 3/20* (2013.01)

(56) References Cited

U.S. PATENT DOCUMENTS

| | | | | |
|---|---|---|---|---|
| 5,676,196 | A * | 10/1997 | Jakubzick | F24F 11/30 165/11.1 |
| 8,295,950 | B1 * | 10/2012 | Wordsworth | B60H 1/323 700/22 |
| 2008/0011005 | A1 | 1/2008 | Obayashi et al. | |
| 2009/0056354 | A1 * | 3/2009 | Davis | B60H 1/3205 62/236 |
| 2011/0204720 | A1 * | 8/2011 | Ruiz | H02J 3/14 307/66 |
| 2013/0241485 | A1 * | 9/2013 | Snyder | B60L 53/56 320/109 |
| 2015/0007591 | A1 * | 1/2015 | Liu | F25B 49/005 62/77 |
| 2015/0246593 | A1 | 9/2015 | Larson et al. | |
| 2015/0338858 | A1 * | 11/2015 | Bates | B60H 1/3232 62/56 |
| 2018/0001745 | A1 * | 1/2018 | Vehr | F25B 49/022 |

* cited by examiner

MULTI-SOURCE POWER MANAGEMENT FOR A TRANSPORT REFRIGERATION SYSTEM

FIELD

This disclosure relates to power management systems in a transport refrigeration system. More particularly, embodiments are disclosed for systems and methods for power management of a transport refrigeration system that utilizes a primary energy source and utility power.

BACKGROUND

A refrigerated transport unit generally has a transport unit and a transport refrigeration system (TRS) used to control an environment of an internal space of the transport unit. The transport refrigeration system may control one or more environmental conditions (e.g., temperature, humidity, air quality, etc.) of the internal space. For example, a transport unit may be a container (such as a flat car, an intermodal container, etc.), a truck, a box car, or other similar transport unit. The TRS can include multiple devices (e.g, a compressor, one or more fans or blowers, a controller, one or more solenoid valves, etc.) that require power in order to operate. When the refrigerated transport unit is parked, the TRS may be configured to utilize power from a standby power source ("utility power").

SUMMARY

This application is directed to systems and methods for power management of a transport refrigeration system that utilizes a primary energy source and utility power. During certain periods (e.g., time of day, number of transport refrigeration systems requesting power, etc.), the amount of utility power available to a parked transport refrigeration system (TRS) can be limited and/or an additional premium may be charged for utility power. For example, a facility may limit the amount of utility power available to each parked TRS due the facility's limitations for providing utility power (e.g., infrastructure limitations). For example, a facility may limit the amount of utility power available to parked TRSs refrigerated transport units to prevent large demand charges or based on a demand response. For example, the additional premium may be based on the utility power costing more (e.g., higher grid prices) or a higher demand for access to utility power (e.g., a larger number of parked TRSs requesting utility power). Regulations (e.g., emission regulations, noise regulations) may limit the operations of a prime mover. In specification locations, local regulations may limit the operation of a prime mover.

The disclosed systems and methods can selectively utilize the prime energy source of the TRS to compensate for a limited amount of utility power being available, to avoid incurring significant costs from the additional premiums, and/or utilize utility power more efficiently. Further, some disclosed systems and methods can selectively operate a prime mover as the prime energy source so that emissions of the prime mover do not exceed one or more regulations.

In an embodiment, a transport refrigeration system (TRS) includes a transport refrigeration unit for conditioning an internal space of a transport unit, and a controller for controlling the operation mode of the TRS. The controller is configured to determine an operating mode for the TRS based on one or more properties of the utility power that is available from the utility power source. The operating modes may utilize utility power or a primary energy source to provide the power required for operating the TRS including the power required by the TRU to climate condition the internal space.

In an embodiment, a method for power management of a transport refrigeration system includes determining an operating mode for the transport refrigeration system. The determination of the operation mode is based on one or more properties of the utility power is available from the utility power source.

In an embodiment, a basis for determining of the operating mode includes the amount of power available from the utility power source. In an embodiment, the basis for determining of the operating mode is based on a demand response. In another embodiment, the basis for determining of the operating mode includes the current cost of the utility power. In another embodiment, the basis for determining the operating mode includes how much conditioning is provided by the transport refrigeration unit to the internal space when the transport refrigeration system is in one of the modes. In another embodiment, the basis for determining the operating mode includes whether operation of a prime mover will violate one or more emission or noise regulations.

BRIEF DESCRIPTION OF THE DRAWINGS

Reference is now made to the drawings in which like reference numbers refer to corresponding parts throughout.

DETAILED DESCRIPTION

In the following detailed description, reference is made to the accompanying drawings, which illustrate embodiments in which the invention may be practiced. These embodiments are described in sufficient detail to enable those skilled in the art to practice what is claimed, and it is to be understood that other embodiments may be utilized without departing form the spirit and the scope of the claims. The following detailed description and the accompanying drawings, therefore, are not to be taken in a finite sense.

Different types of goods/cargo may need to be stored at specific environmental condition(s) while being stored within a transport unit. For example, perishable goods may need to be stored within a specific temperature range to prevent spoilage and liquid goods may need to be kept at a temperature above their freezing point. Also, goods having electronic components may need to be kept in environmental conditions with a lower moisture content to avoid damage to their electronic components. A transport refrigeration unit may blow conditioned air into the interior of a transport unit to keep the air within the interior space of the transport unit at the desired environmental conditions.

The embodiments described herein are directed to power management for transport refrigeration systems. More particularly, the embodiments described herein relate to methods and systems for power management that utilizes a primary energy source or a utility power source for providing the power required by a transport refrigeration unit. Embodiments described herein can utilize the primary energy source or the utility power source to provide power to the transport refrigeration unit such that the transport refrigeration unit provides adequate climate conditioning to the internal space of a transport unit. The transport refrigeration system can provide power to a transport refrigeration unit to account for when the utility power source can only provide a limited amount of power. In some embodiments, the transport refrigeration unit can be operated using power generated by a prime mover or power provided by the utility power source so as to not incur significant additional costs and/or to not violate any regulations regarding operation of a prime mover as the prime energy source (e.g., emission regulations, noise regulations). For example, emissions regulations may include air pollutants generated during engine operation which may include, but not are not limited to, $NO_X$, $SO_X$, and/or $CO_2$.

Figure 1:
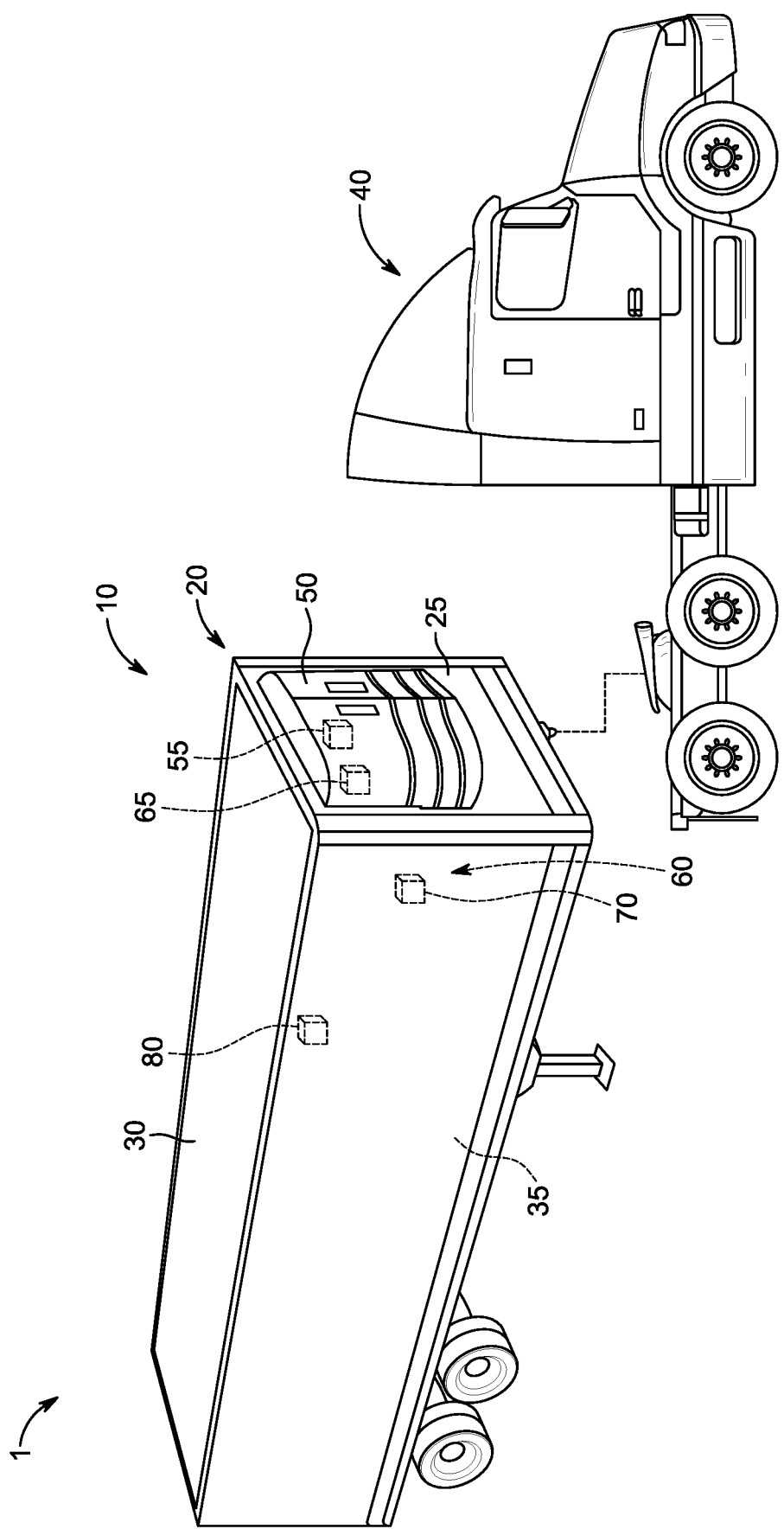
FIG. 1 is a perspective view of a refrigerated transport unit, according to one embodiment.

FIG. 1 illustrates an embodiment of a refrigerated transport unit 1. The refrigerated transport unit 1 includes a transport refrigeration system (TRS) 10 and a transport unit 20. Dashed lines are used in FIG. 1 to illustrate features that would not be visible in the view shown. The transport unit 20 may be attached to the tractor 40 configured to tow the transport unit 20 to and from different locations. When not being transported, the transport unit 20 may be parked and unattached from the tractor 40. It will be appreciated that the embodiments described herein are not limited to tractor and trailer units, but can apply to any type of transport unit such as a container (e.g., a container on a flat car, an intermodal container, etc.), a truck, a box car, or other similar transport unit.

The TRS 10 includes a transport refrigeration unit (TRU) 50 that is disposed on a front wall 25 of the transport unit 20. In other embodiments, the TRU 50 may be disposed on a roof 30 or other wall of the transport unit 20. The TRU 50 provides conditioned air into an internal space 35 of the transport unit 20 to provide a desired conditioned environment for the goods being held within the internal space 35 of the transport unit 20. The desired conditioned environment can have one or more desired environmental conditions (e.g., temperature, humidity, air quality, etc. of the internal space 35). For example, the TRU 50 may provide cooled air to the internal space 35 when perishable goods are being kept within the transport unit 20. In another example, the TRU 50 may dehumidify the air within the internal space 35 of the transport unit 20 when electronics are within the transport unit 20. The transport unit 50 includes a compressor 55. In an embodiment, the compressor 55 can be used in a refrigeration circuit (not shown) to compress a working fluid to heat or cool air. In other embodiments, the compressor 55 may be used for air quality control.

The TRS 10 includes a programmable TRS controller 60. The programmable TRS controller 60 may be a single integrated control unit 65 or a control unit formed by a distributed network of TRS elements 65, 70. The TRS 10 also includes one or more sensors 80 configured to detect one or more environmental conditions (e.g., temperature, humidity, air quality, etc.) of the internal space 35 of the transport unit 20. The TRS 10 can use the one or more sensors 80 to control the TRU 50 so that the internal space 35 has the desired environmental condition(s).

Figure 2:
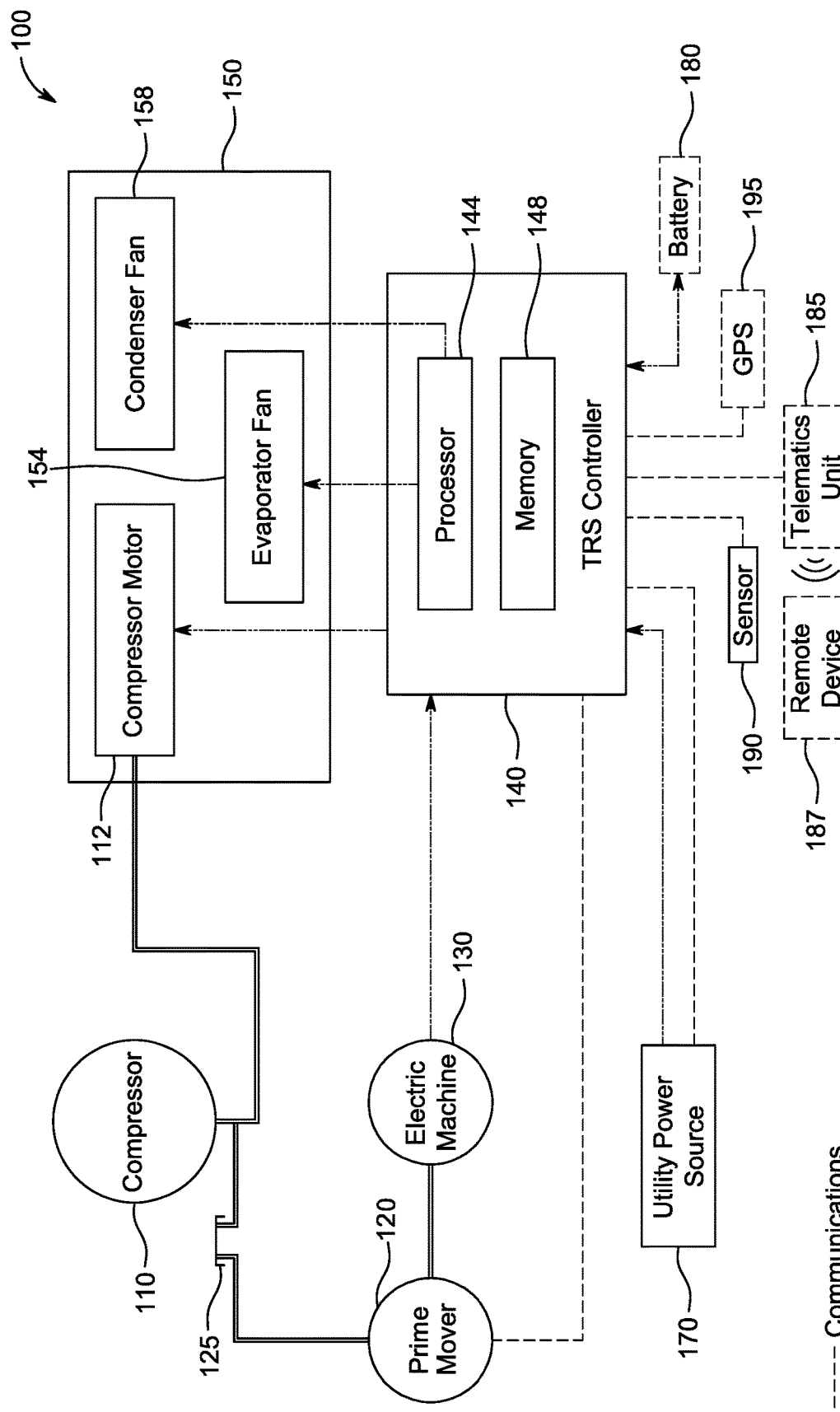
FIG. 2 illustrates a block schematic diagram for a power management system for a transport refrigeration system, according to a first embodiment.

FIG. 2 illustrates a block schematic diagram of a power management system 100 for a TRS according to a first embodiment. For example, the power management system 100 may be used for powering the TRS 10 shown in FIG. 1. The power management system 100 is configured to provide power to a TRU (e.g., the TRU 50 in FIG. 1) and its various components that require power. The TRS includes a compressor 110. As discussed above, the compressor 110 may be for a refrigerant circuit (not shown) or other air quality control systems. For example, when the compressor 110 is in a refrigerant circuit, the compressor 110 can compress a working fluid, the compressed working fluid travels through the refrigerant circuit to exchange heat with air (i.e., condition air), and the conditioned air is blown into the internal space of the transport unit to climate condition the internal space. In an embodiment, the compressor 110 is disposed in the TRU.

The power management system 100 includes an electrical machine 130 mechanically connected to a prime mover 120, and can be connected to a utility power source 170. The prime mover 120 can be, for example, a diesel engine, a compressed natural gas engine, etc. In an embodiment, the prime mover 120 can be a diesel engine disposed in the TRU. In another embodiment, the prime mover 120 can be disposed in the tractor/truck/vehicle that hauls the transport unit (e.g., the tractor 40 in FIG. 1).

The electric machine 130 is configured to receive mechanical power from the prime mover 120 and to produce electrical power. For example, the electric machine 130 can be and/or include an induction machine (e.g., an asynchronous induction machine), a motor, etc. When the prime mover 120 is operating, the prime mover 120 and electric machine 130 can provide electric power to the TRS controller 140.

In this embodiment, the compressor 110 uses mechanical power to operate. As shown in FIG. 2, the prime mover 120 is configured to provide mechanical power to the compressor 110 when operating. The compressor 110 is also mechanically connected to a compressor motor 112.

The compressor motor 112 is an electrical motor configured to be an alternative source of mechanical power for the compressor 110. The compressor motor 112 provides mechanical power to the compressor 110 when, for example, the prime mover 120 is not being operated or otherwise unable to generate and provide power to the compressor 110. Thus, the compressor 110 is configured to be mechanically driven by either the prime mover 120 or the compressor motor 112. The compressor motor 112 is shown in FIG. 2 as being separate from the compressor 110. However, it should be appreciated that the compressor motor 112 may be incorporated into the compressor 110 in an embodiment. For example, the compressor 110 and the compressor motor 112 may be provided together as part of a hermetically sealed compressor.

A clutch 125 is proved in the mechanical connection between the prime mover 120 and the compressor 110. The clutch 125 is configured to disengage the mechanical connection of the prime mover 120. Accordingly, the compressor motor 112, prime mover 120, and compressor 110 may be provided in a single power train. The clutch 125 may be engaged to disengage the prime mover 120 when the compressor motor 112 is being used to provide the mechanical power to the compressor 110 instead of the prime mover 120. In an embodiment, the compressor motor 112 may be, for example, an induction motor that can be freely rotated when not being operated.

The TRS may include various components that require electrical power to operate (e.g., fans, blowers, valves, sensors, etc.). An electrical power load 150 is the electrical power required by said electrically powered components of the TRS. As shown in FIG. 2, the electrical power load 150 includes the compressor motor 112 (when utilized), an evaporator fan 154, and a condenser fan 158. However, it should be appreciated that the electrical power load 150 is based on the configuration of the TRS and the TRU and may include additional electrically powered components. That is, the TRS may include (additionally or alternatively) different components (e.g., equipment, electronics, etc.) that require electrical power in addition to the evaporator fan 154 and the condenser fan 158. In such embodiments, the electric power load 150 includes said components of the TRS that require electrical power. It should be understood that the components of the TRU require different amounts of electrical power depending on how the TRS is currently operating (e.g., operating at maximum capacity or minimum capacity, shutdown, etc.), which depends on the climate conditioning presently required for the internal space. Therefore, the components of the electrical power load 150 and the amount of power required by said components can constantly change based the current conditioning being provided to the internal space.

The TRS controller 140 controls the operation of the TRS and the TRU. The TRS controller 140 includes a memory 144 for storing information, and a processor 148. The TRS controller 140 controls the TRS to climate condition the internal space so that the internal space reaches and maintains one or more desired environmental conditions. In an embodiment, the TRS controller 140 can be electrically connected to each of the components of the TRU that use electrical power. The TRS controller 140 can provide electrical power to each of components of the electrical power load 150.

When not in transit, a transport unit can be parked at a facility that includes a utility power source 170. The TRS can be electrically connected to the utility power source 170 so that the utility power source 170 can provide power to the stationary TRS. In an embodiment, the TRS may include a plug-in (not shown) that allows for the TRS to be electrically connected to the utility power source 170. For example, the facility may be a pick up facility or drop off facility for some or all of the goods transported by the transport unit, an intermediate stopping location (e.g., overnight stopping location, etc.), or a location that uses the transport unit to temporarily store goods. The utility power source 170 is a power source external to the refrigerated transport unit and does not travel with the refrigerated transport unit. In an embodiment, the utility power source 170 can be a utility power grid. In other embodiments, the utility power source 170 can be different types of power sources at the facility such as, but not limited to, a power generator at the facility, solar panel(s) at the facility, and/or wind turbine(s) at the facility, etc.

Utility power from the utility power source 170 can be used to reduce the noise and/or emissions of parked TRS(s). That is, utility power can be used to reduce the amount of time the prime mover 170 is operated. However, many facilities only provide a limited amount of power to parked TRSs.

In an embodiment, a utility power source 170 may only provide a limited amount of power to a parked TRS during certain time periods. For example, the utility power source 170 may provide only a limited amount of power to each TRS during one or more specific time period(s) (e.g., during peak usage times). In some embodiments, the amount of power or the specific period(s) in which the utility power is limited may be based on, for example, one or more of the number of TRSs parked at the facility requesting utility power, the cost for providing the utility power at the particular time of day, the electricity consumption rate of the facility, a demand response by the grid electricity provider, etc.

The price for grid electricity for a commercial consumer typically includes an additional charge based on their highest electricity consumption rate (e.g., kW) ("demand charge"). The demand charge can be applied to the total amount of utility power consumed during a set period (e.g., a billing period). A facility may limit its electricity consumption rate so as to not exceed a predetermined amount. For example, the predetermined amount for the maximum electricity consumption rate may be determined by the facility or contractually agreed to by the facility and the grid electricity provider. Thus, the amount of utility power provided to a parked TRS may be limited based on a current consumption rate of utility power by the facility. In an embodiment, the operation of TRU may be determined based on a predetermined maximum consumption rate.

A grid electricity provider may also request electricity consumption be reduced during times when the electricity consumption of its customers is increased ("demand response"). For example, the electricity consumption of consumers may increase when an area is experiencing increased ambient temperatures (e.g., during the summer). A commercial consumer may be contractually required to meet any demand responses and/or the grid electricity provider may provide discounted electricity prices for meeting demand responses. Thus, the amount of electricity provided to a parked TRS may be limited due to a demand response. In an embodiment, the operation of TRU may be determined based on a demand response.

A facility may charge an additional premium for the utility power provided by the utility power source 170. For example, some facilities may charge an additional premium during one or more specific time period(s) or when a large number of TRSs are parked at the facility that desire utility power. In an embodiment, the operation of the TRU may be determined based on the current cost of utility power from the utility power source 170.

The power management system 100 provides power for the compressor 110 and the electrical power load 150. In an embodiment, the power management system 100 is configured to utilize either the prime mover 120 or the utility power source 170 to provide power. The TRS controller 140 is configured to determine whether the prime mover 120 or the utility power source 170 should be used as a power source.

When the power management system 100 utilizes the prime mover 120 to be the source of power, the prime mover 120 supplies mechanical power to drive the compressor 110 and electrical power for the electrical power load 150 via the electric machine 130 and the TRS controller 140. When the power management system 100 utilizes the utility power source 170 to be the source of power, electrical power is supplied from the utility power source 170 to the electrical power load 150 and the compressor motor 112 supplies the mechanical power to drive the compressor 112.

As shown in FIG. 2, the TRS controller 140 is connected to a sensor 190. The sensor 190 is configured to detect an environmental condition of the internal space of the transport unit. In an embodiment, the sensor 190 may detect two or more environmental conditions of the internal space. In another embodiment, the TRS controller 140 is connected to multiple sensors 190 to detecting multiple environmental conditions of the internal space.

Optionally, the power management system 100 may include a battery 180. In an embodiment, the battery 180 may be charged using the electrical power supplied from the electric machine 130 or the electric power supplied from the utility power source 170. The battery 180 is an example of a second power source of the primary power source. For example, the battery 180 may provide power when the TRU is utilizing the utility power source 170, but the utility power source 170 is currently limited or cannot otherwise provide sufficient power as required by the electrical power load 150. In an embodiment, the battery 180 may be disposed in or on the transport unit (e.g., transport unit 20). In an embodiment, the battery 180 may be disposed in the TRU (e.g., TRU 50). In another embodiment, the battery 180 may be disposed in the tractor configured to tow the transport unit (e.g., tractor 40).

The prime mover 120 is the primary energy source of the power management system 100 in FIG. 2. However, it should be appreciated that the power management system 100 in an embodiment may be a hybrid power system or a fully electric power system. In an embodiment, the TRS may be a hybrid power system that utilizes the prime mover 120 in combination with the battery 180. In such an embodiment, the primary energy source of the power management system 100 (and the TRS) includes both the prime mover 120 and the battery 180. In another embodiment, the TRS may be a fully electric power system that does not include the prime mover 120 or the electric machine 130. In a fully electric power system, the prime mover 120 and electric machine 130 of the power management system can be replaced with the battery 180. In such an embodiment, the primary energy source of the power management system 100 (and the TRS) is the battery 180.

Optionally, the TRS controller 140 may be connected to a telematics unit 185 of the TRS. In an embodiment, telematics unit 185 is disposed in the TRU. In another embodiment, telematics unit 185 can be disposed in the tractor/truck/vehicle that hauls the transport unit (e.g., the tractor 40 in FIG. 1). The telematics unit 185 is configured to wirelessly communicate with a remote electronic device 187. The remote electronic device 187 may be, for example, a computer, a server, a server network, etc. For example, the telematics unit 185 may wirelessly communicate with a remote electronic device of a facility that directs operation of multiple TRSs, multiple transport units, or its drivers or a remote electronic device at the facility at which the refrigerated transport units are parked. In an embodiment, the telematics unit 185 may be incorporated into the TRS controller 140.

Optionally, the TRS controller 140 may be connected to a GPS device 195. The GPS device 195 is configured to determine the current location of the transport unit. The GPS device 195 provides the current location of the transport to the TRS controller 140. The TRS controller 140 may use the current location of the transport unit to determine one or more emission or noise regulations for the TRS. In particular, the emission or noise regulations for the TRS may be specific to the operation of the prime mover 120 of the TRS. In an embodiment, when the utility power source 170 is available, the TRS controller 140 may determine which power source to use for the TRS based on the one or more emission or noise regulations. In an embodiment, the GPS 195 may be incorporated into the TRS controller 140 and/or the telematics unit 185.

Figure 3:
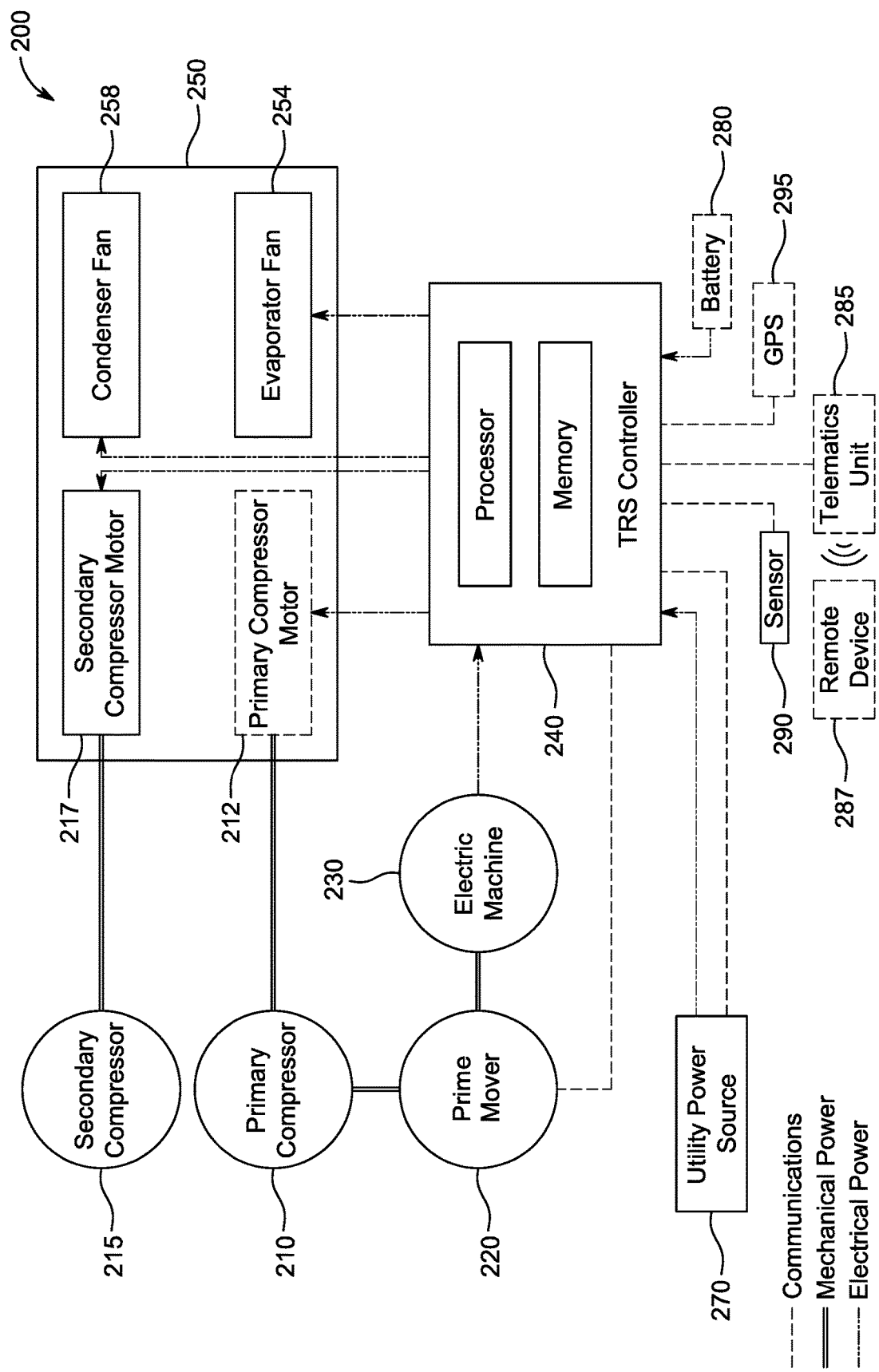
FIG. 3 illustrates a block schematic diagram for a power management system for a transport refrigeration system, according to a second embodiment.

FIG. 3 illustrates a block schematic diagram of a power management system 200 for a TRS according to a second embodiment. For example, the power management system 200 may be used for powering the TRS 10 shown in FIG. 1. Similar to the power management system 100 in FIG. 2, the power management system 200 includes a TRS controller 240 electrically connected to an electrical machine 230 mechanically connected to a prime mover 220, a utility power source 270, and an optional battery 280. Similar to the power management system 100 shown in FIG. 2, the TRS controller 240 is also connected to a sensor 290, an optional telematics unit 285 configured to communicate with a remote electronic device 287, and an optional GPS device 295. The prime mover 220 is configured to provide mechanical energy to a primary compressor 210. The power system 200 supplies electrical power for the electrical power load 250 of the TRS.

In contrast to the power management system 100 in FIG. 2, the power management system 200 in FIG. 3 may also provide power to a secondary compressor 215 of the TRS. The secondary compressor 215 is driven by a secondary compressor motor 217. The secondary compressor motor 216 is shown in FIG. 3 as being separate from the secondary compressor 215. However, it should be appreciated that the secondary compressor motor 217 may be incorporated into the secondary compressor 215 in an embodiment. For example, the secondary compressor 215 and secondary compressor motor 217 may be provided together as part of a hermetically sealed compressor.

The primary compressor 210 is configured to provide adequate conditioning to address larger changes in the environment of the internal space. For example, the TRU can utilize the primary compressor 210 when the TRU's provides its maximum amount of climate conditioning. Operating the primary compressor 210 at partial capacity or intermittently may be inefficient. The secondary compressor 215 can have a smaller capacity relative to the primary compressor 210 and can be configured for operating the TRU at lower capacities (relative to the primary compressor 210) more efficiently. In an embodiment, the TRU can utilize the secondary compressor 215 for smaller changes to the environmental condition. For example, the secondary compressor 215 can be configured to address smaller/slower changes in an environmental condition that occurs due to the transport unit being in an non-conditioned area (e.g., outside, in an open warehouse, etc.), and the primary compressor 210 can be configured to address larger changes that occur due the transport unit being opened to add or remove goods or new goods needing to be climate conditioned. For example, the primary compressor 210 and the secondary compressor 215 may be arranged in parallel and operated alternately for compressing a refrigerant in a refrigerant circuit (not shown) or for compressing fluid in other air quality control systems. In an embodiment, secondary compressor 215 may have a capacity that is at or about or less than 70% of the capacity of the primary compressor 210. In another embodiment, the capacity of the secondary compressor 215 may be at or about or less than 50% of the capacity of the primary compressor 210. The TRU may be configured to utilize the secondary compressor 215 instead of the primary compressor 210 when the compressor capacity for a desired climate conditioning is within the capacity of the secondary compressor 215.

In an embodiment, the maximum amount of climate conditioning provided by the TRU when utilizing the primary compressor 210 may be at least twice as large as the maximum amount of conditioning provided by the TRU when utilizing the secondary compressor 215. In an embodiment, the maximum amount of conditioning provided by the TRU when utilizing the primary compressor 210 may be at least three times as large as the maximum amount provided by the TRU when utilizing the secondary compressor 215.

Optionally, the primary compressor 210 in an embodiment may be connected to an optional primary compressor motor 212. The primary compressor 210 and the primary compressor motor 212 are shown in FIG. 3 as being separate. However, it should be appreciated that the primary compressor motor 212 may be incorporated into the primary compressor 210 in an embodiment. For example, the primary compressor 210 and primary compressor motor 212 may be provided together in a hermetically sealed compressor. In an embodiment, the prime mover 220 may not provide mechanical power to the primary compressor directly 220. Instead, electric power generated by the electric machine 230 may be provided to the primary compressor motor 212 via the TRS controller 240, and the primary compressor motor 212 can provide mechanical power to drive the primary compressor 210.

The prime mover 220 is the primary energy source of the power management system 200 in FIG. 3. However, it should be appreciated that the power management system 200 in an embodiment may be a hybrid system or a fully electric system as similarly discussed above with respect to the power management system 100 in FIG. 2. In such embodiments, the inclusion of the optional primary compressor motor 212 may allow for the power provided by the battery 280 to drive the primary compressor 210. A clutch may also be provided between the prime mover 220 and the primary compressor 210 similar to the clutch 125 in FIG. 2.

Figure 4:
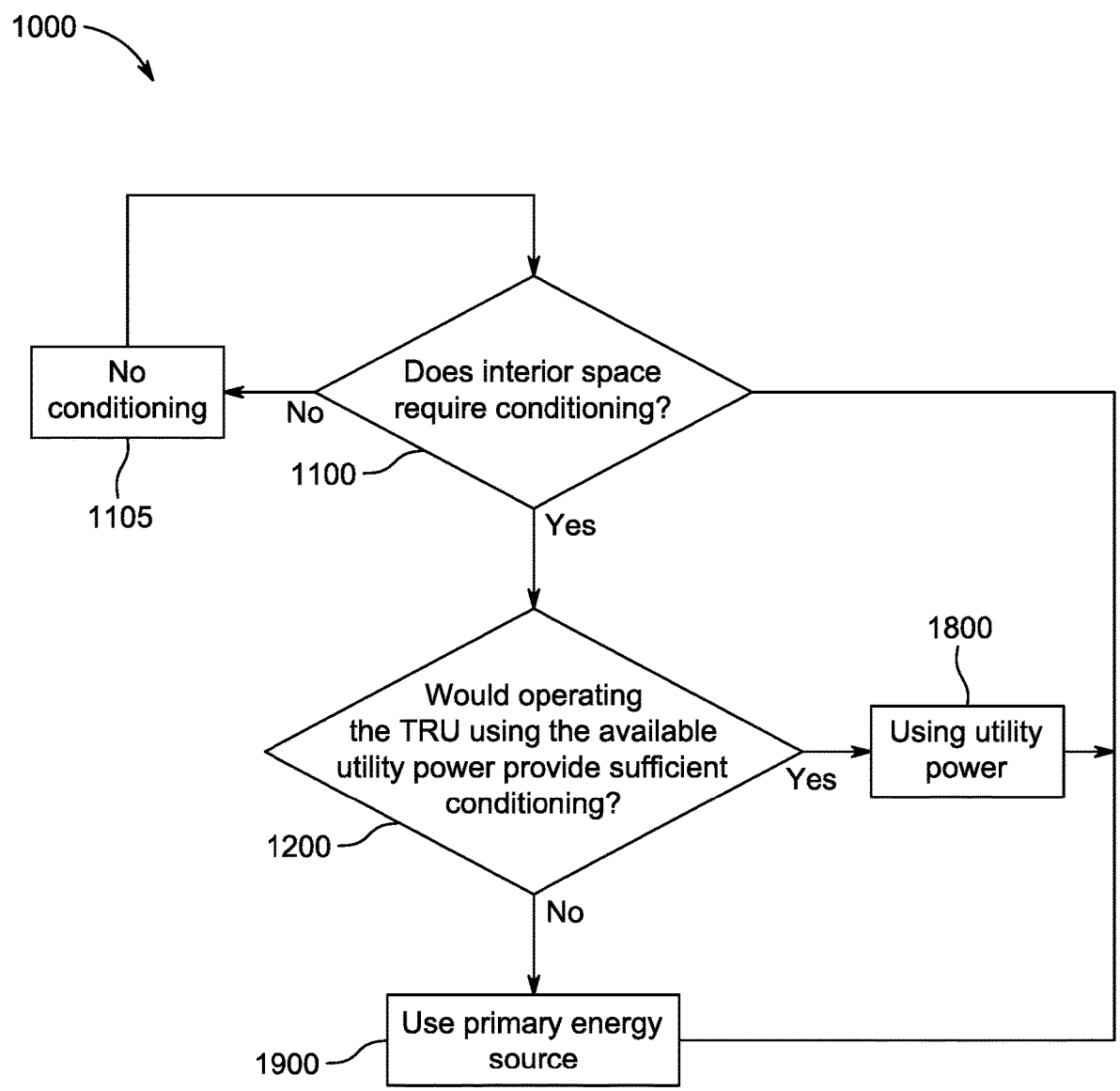
FIG. 4 illustrates a flowchart for a method of power management for a transport refrigeration system, according to one embodiment.

FIG. 4 is a flowchart for a method 1000 of power management for a TRS (e.g., the TRS 10 shown in FIG. 1). In an embodiment, the method 1000 of power management may be employed by the power management system 100 in FIG. 2 or the power management system 200 in FIG. 3.

At 1100, a TRS controller (e.g., the TRS controller 60, 140, 240) determines if an internal space of a transport unit (e.g., transport unit 20) requires climate conditioning based on one or more environmental conditions (e.g., temperature, humidity, air quality, etc.) of the internal space. In an embodiment, the TRS controller can use a sensor (e.g., sensor 80, 190, 290) to determine the environmental condition of the internal space. In an embodiment, the TRS controller determines an internal space requires climate conditioning by comparing a current environmental condition to a desired environmental condition for the internal space. If the internal space requires climate conditioning, the method 1000 proceeds to 1200. If the internal space does not require climate conditioning, the method 1000 proceeds to 1105. At 1105, the TRS is operated such that the TRU provides no climate conditioning to the internal space. This may be referred to as an off mode. In an embodiment, the TRU may not require a significant or substantial amount of power while operating in the off mode. The method 1000 then proceeds back to 1100.

At 1200, the TRS controller determines if operating the TRU (e.g., powering a compressor, an evaporator fan, a condenser fan, or any other electrical power load) using available utility power from a utility power source (e.g., utility power source 170, utility power source 270) would provide sufficient climate conditioning required for the internal space. For example, sufficient climate conditioning can be the amount of climate conditioning required so that the internal space reaches the desired environmental condition in a set period of time. The set period of time may depend on the goods being transported, or how often the TRS should be shutdown. For example, goods that are more easily affected by a change in their environment may require greater sufficient climate conditioning to ensure that the goods stay within their desired climate conditions. In an embodiment, the determination at 1200 may also consider the operational ability of the prime mover (e.g., prime mover 120, 220) and/or the electric machine 230 of the TRS. For example, the TRS controller at 1200 may determine whether the prime mover is currently operable, whether a battery 180 of the TRS is able to provide a sufficient charge to start the prime mover, and/or if there is a fault in the prime mover or the electric machine. If operating the TRS using the available utility power ($P_{utility}$) would provide sufficient climate conditioning, the method 1000 proceeds to 1800. If operating the TRS using the available utility power ($P_{utility}$) would not provide sufficient climate conditioning, the method 1000 proceeds to 1900.

At 1800, the TRS controller operates the TRS to provide the utility power to the TRU to climate condition the internal space. Operating the TRS using utility power may be referred to as standby mode. The method 1000 then proceeds back to 1100.

At 1900, the TRS controller utilizes the primary energy source of the TRS to provide power for the TRU to climate condition the internal space. This may be referred to as internal energy mode. In an embodiment, 1900 may include operating the prime mover to generate the power for the TRU to climate condition the internal space. In another embodiment, 1900 may include utilizing a battery of the TRS (e.g., battery 180, 280) to provide the power for the TRU to climate condition the internal space. In an embodiment, 1900 may include a combination of operating the prime mover of the TRS and utilizing the battery of the TRS to provide the power for the TRU to climate condition the internal space. In an embodiment, operating the TRS using the prime mover can allow the TRS to provide a maximum amount of cooling. The method 1000 then proceeds back to 1100.

In an embodiment, the standby mode at 1800 utilizes a different configuration for the TRU than the internal energy mode at 1900. In such an embodiment, the configuration for standby mode may provide lesser climate conditioning compared to the internal energy mode, but can provide the lesser climate conditioning more efficiently than operating the TRU at partial capacity or at continuous intermittent intervals. In an embodiment, the equipment of the TRU utilized by the internal energy mode is at least partially different from the equipment of the TRU utilized by the standby mode. For example, the standby mode may utilize the utility power to operate an electric motor (e.g., secondary compressor motor 217) to drive a secondary compressor (e.g., secondary compressor 215) that has a lower capacity than a primary compressor (e.g., primary compressor 210) operated by the prime mover. The power consumed by the TRU in the standby mode is limited as a result of the different equipment utilized by the standby mode. As discussed above, the climate conditioning provided by the standby motor can be more efficient than operating the primary compressor at partial capacity or for a short time period a large number of times. Generally, a prime mover has a minimum runtime for operating once turned on to prevent the prime mover from being damaged. However, operating the compressor at full capacity using the prime mover for the minimum runtime may exceed a desired amount of climate conditioning for the internal space. Accordingly, the standby mode can advantageously avoid use of the prime mover during such periods.

Figure 5:
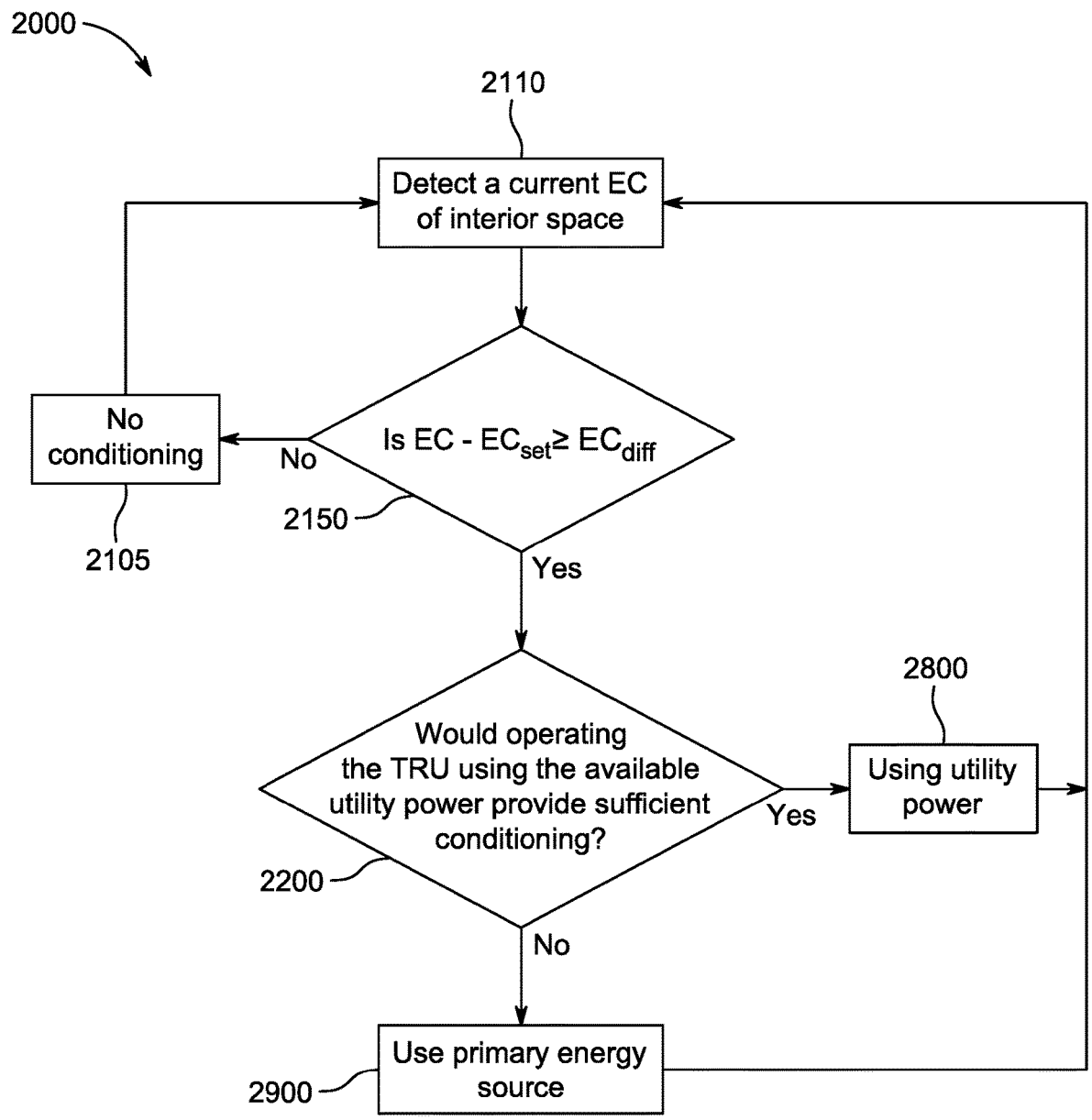
FIG. 5 illustrates a flowchart for a method of power management for a transport refrigeration system, according to one embodiment.

FIG. 5 is a flowchart for a method 2000 of power management for a TRS (e.g., the TRS 10). In an embodiment, the method 2000 of power management may be employed by the power management system 100 in FIG. 2 or the power management system 200 in FIG. 3.

At 2110, a TRS controller (e.g., the TRS controller 60, 140, 240) detects a current environmental condition (e.g., temperature, humidity, air quality, etc.) (EC) of the internal space of the transport unit (e.g., transport unit 20). In an embodiment, the TRS controller can use a sensor (e.g., sensor 80, 190, 290) to determine the environmental condition EC of the internal space.

At 2150, the TRS controller determines if the internal space requires climate conditioning based on the current environmental condition (EC) and a desired environmental condition ($EC_{set}$). In an embodiment, the TRS controller can determine that climate conditioning of the internal space is required when a difference between the current environmental condition and a desired environmental condition (EC–$EC_{set}$) is equal to or greater than a predetermined amount ($EC_{diff}$). For example, a desired environmental condition may be a specific temperature or temperature range, a specific humidity or humidity range, or specific nitrogen content or range of nitrogen content. In an embodiment, the determination by the TRS controller of whether climate conditioning of the internal space is required may be based on the absolute value of the difference (|EC–$EC_{set}$|) between the current environmental condition (EC) and the desired environmental condition ($EC_{set}$) so as to prevent any significant variance from the desired environmental condition ($EC_{set}$).

This predetermined amount ($EC_{diff}$) allows for variance between the current environmental condition (EC) and the desired environmental condition ($EC_{set}$). The predetermined amount ($EC_{diff}$) may be based on a variety of factors. Factors for determining the predetermined amount may include, but are not limited to, how change in the environmental condition affects the goods in the internal space (e.g., likelihood that the difference will damage the goods in the internal space), if the desired environmental condition ($EC_{set}$) allows for variance, and/or how often the TRU should be operating. In an embodiment, the allowed variance may be a predetermined amount based on one or more of said factors. In other embodiments, the predetermined difference may be zero. If the difference (EC–$EC_{set}$) between the current environmental condition (EC) and a desired environmental condition ($EC_{set}$) is less than a predetermined amount ($EC_{diff}$), the method 2000 proceeds to 2105. If the difference (EC–$EC_{set}$) between the current environmental condition (EC) and a desired environmental condition ($EC_{set}$) is equal to or greater than a predetermined amount ($EC_{diff}$), the method 2000 proceeds to 2200.

At 2105, the TRS is operated such that the TRU provides no climate conditioning to the internal space. This may be referred to as an off mode. In an embodiment, the TRU may not require a significant or substantial amount of power while operating in the off mode. The method 2000 then proceeds back to the 2110.

At 2200, the TRS controller determines if operating the TRU (e.g., powering a compressor, an evaporator fan, a condenser fan, or any other electrical power load) using utility power available from a utility power source (e.g., utility power source 170, 270) would provide sufficient climate conditioning for the internal space. In an embodiment, 2200 is similar to 1200 as discussed above. If operating the TRU using the available utility power would provide sufficient climate conditioning to the internal space, the method 2000 proceeds to 2800. If operating the TRU using the available utility power would not provide sufficient climate conditioning for the internal space, the method 2000 proceeds to 2900.

At 2800, the TRS controller operates the TRS to provide utility power to the TRU to climate condition the internal space. This may be referred to as a standby mode. In an embodiment, 2800 may be similar to 1800 as discussed above. The method 2000 then proceeds back to 2110.

At 2900, the TRS controller utilizes the primary energy source of the TRS to provide the power for the TRU to climate condition the internal space. This may be referred to as an internal energy mode. In an embodiment, 2900 may be similar to 1800 as discussed above. For example, 2900 may include operating the prime mover of the TRS (e.g., prime mover 120, 220) and/or utilizing a battery of the TRS (e.g., battery 180, 280) to provide the power to the TRU to climate condition the internal space as similarly discussed above regarding 1800. The method 2000 then proceeds back to 2110.

Figure 6:
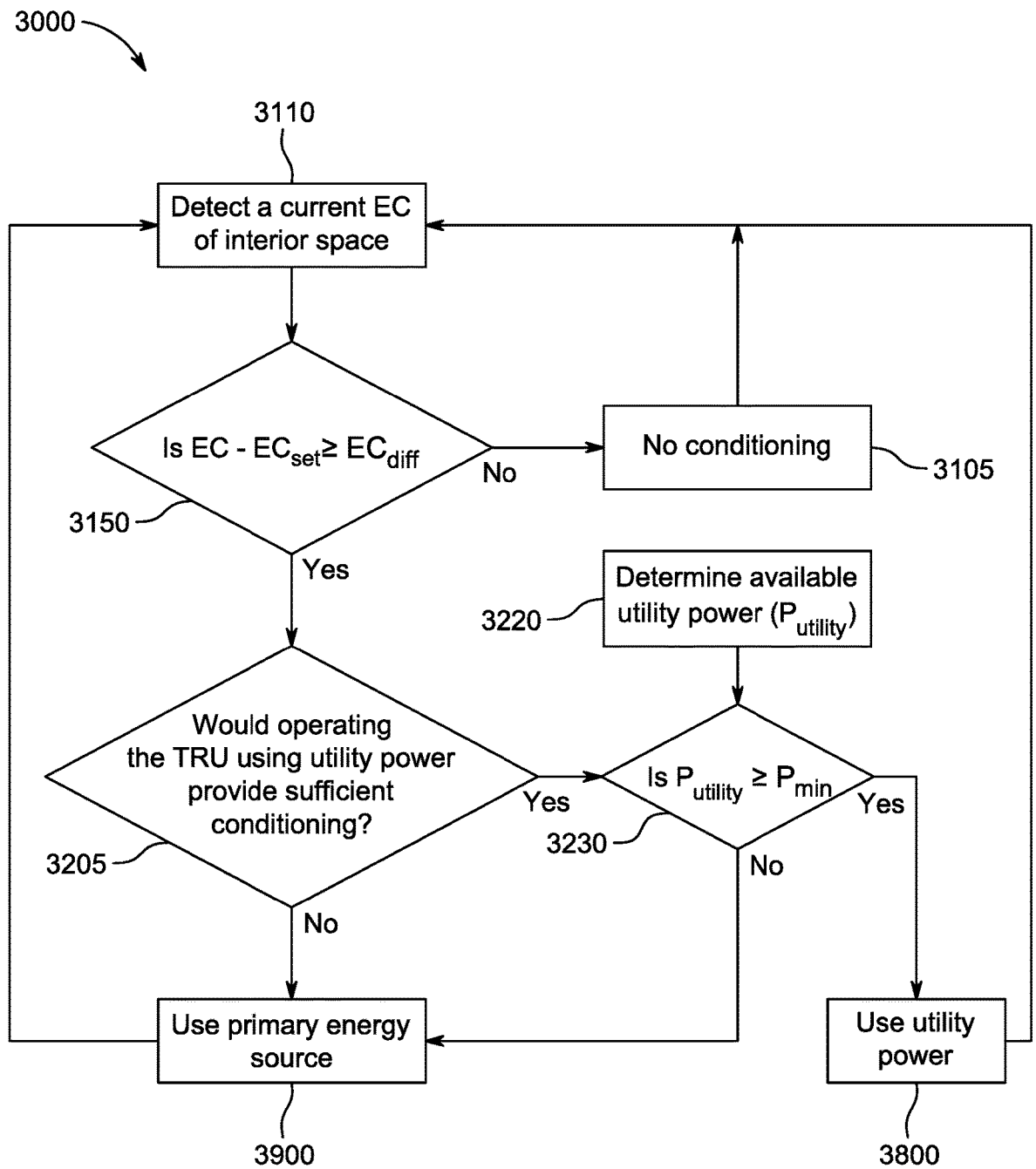
FIG. 6 illustrates a flowchart for a method of power management for a transport refrigeration system, according to one embodiment.

FIG. 6 is a flowchart for a method 3000 of power management for a TRS (e.g., the TRS 10). In an embodiment, the method 3000 of power management may be employed by the power management system 100 in FIG. 2 or the power management system 200 in FIG. 3.

At 3110, a TRS controller (e.g., the TRS controller 60, 140, 240) detects a current environmental condition (EC) of the internal space of a transport unit (e.g., transport unit 20). In an embodiment, the TRS controller uses a sensor (e.g., sensor 80) to determine the environmental condition EC of the internal space.

At 3150, the TRS controller determines if the internal space requires climate conditioning based on the current environmental condition (EC) and a desired environmental condition ($EC_{set}$). In an embodiment, the TRS controller can determine climate conditioning of the internal space is required when the difference between the current environmental condition and a desired environmental condition (EC–$EC_{set}$) is equal to or greater than a predetermined amount ($EC_{diff}$). In an embodiment, the predetermined amount ($EC_{diff}$) at 3150 may be similar to the predetermined amount ($EC_{diff}$) for 2150 in FIG. 5 as discussed above. If the difference (EC–$EC_{set}$) is equal to or greater than the predetermined amount ($EC_{diff}$), the method 3000 proceeds to 3205. If the difference is less than the predetermined amount ($EC_{diff}$), the method 3000 proceeds to 3105. In an embodiment, 3150 is similar to 2150 as discussed above.

At 3105, the TRS is operated such that the TRU provides no climate conditioning to the internal space. This may be referred to as an off mode. In an embodiment, the TRU may not require a significant or substantial amount of power while operating in the off mode. The method 3000 then proceeds back to the 3110.

At 3205, the TRS controller determines if operating the TRU (e.g., powering a compressor, an evaporator fan, a condenser fan, or any other electrical power load) using utility power would provide sufficient climate conditioning to the internal space of the transport unit. As discussed above, typically, the TRU has a configuration for using utility power that can have a lesser conditioning capacity relative to using power provided by a prime mover. At 3205, the TRS controller determines if the climate conditioning capacity of the TRU when configured to operate using utility power would provide sufficient climate conditioning. If the TRU when using utility power would provide sufficient climate conditioning, the method 3000 proceeds to 3220. If the TRU when using utility power would not provide sufficient climate conditioning, the method 3000 proceeds to 3900.

At 3220, the TRS determines the amount of utility power ($P_{utility}$) that is available from the utility power source (e.g., utility power source 170, 270). In an embodiment, the TRS controller may detect the amount of power that is currently being provided to the TRS from the utility power source. In another embodiment, TRS controller may communicate with the facility that includes the utility power source to determine how much utility power ($P_{utility}$) is available. In other embodiments, the amount of utility power ($P_{utility}$) available may be provided by a local operator, based on a previously stored schedule, or from a remote operator or server (e.g., remote electronic device 187, 287). For example, a telematics unit of the TRS (e.g., telematics unit 185, 285) may be utilized to communicate with the facility, the local operator, or the remote operator or device. In an embodiment, the available amount of utility power ($P_{utility}$) may be determined based on a current electricity consumption rate of the facility providing the utility power and a predetermined maximum electricity consumption rate or a demand response. The determined available utility power ($P_{utility}$) is used at 3230. It should be appreciated that in an embodiment, 3220 may be incorporated into 3230.

At 3230, the TRS controller determines if the amount of available utility power ($P_{utility}$) is equal to or greater than a minimum power ($P_{min}$). The minimum power $P_{min}$ is the minimum amount of power required by the TRS to operate the TRU (e.g., powering a compressor, an evaporator fan, a condenser fan, or any other electrical power load) to provide sufficient climate conditioning to the internal space. In an embodiment, the TRS may operate to ensure that the internal space maintains multiple desired environmental conditions (e.g., a desired temperature, a desired humidity, a desired air quality, etc.). The TRU may utilize its components differently to provide different climate conditioning based on which environmental condition(s) need to be addressed. In such an embodiment, the minimum power $P_{min}$ may be different based on the configuration of the TRU and/or the climate conditioning desired for the internal space by the TRU. If the available utility power ($P_{utility}$) is greater than or equal to the minimum power ($P_{min}$), the method 3000 proceeds to 3800. If the available utility power ($P_{utility}$) is less than the minimum power ($P_{min}$), the method 3000 proceeds to 3900.

At 3800, the TRS controller operates the TRS to provide utility power to the TRU to climate condition the internal space. This may be referred to as a standby mode. In an embodiment, 3800 may be similar to 1800 as discussed above. The method 3000 then proceeds back to 3110.

At 3900, the TRS controller utilizes the primary energy source of the TRS to provide the power for the TRU to climate condition the internal space. This may be referred to as an internal energy mode. In an embodiment, 3900 may be similar to 1800 as discussed above. For example, 3900 may include operating the prime mover of the TRS (e.g., prime mover 120, 220) and/or utilizing a battery of the TRS (e.g., battery 180, 280) to provide the power to the TRU to climate condition the internal space as similarly discussed above regarding 1800. The method 3000 then proceeds back to 3110.

The method 3000 of power management in FIG. 6 operates a TRS using either a utility power source or a primary energy source of the TRS to account for the utility power source providing limited amounts of power. The method 3000 of power management also allows for the TRS to operate the TRU more efficiently at partial capacities using utility power, while allowing the TRS to operate the TRU at a higher capacity using a prime mover when needed.

Figure 7:
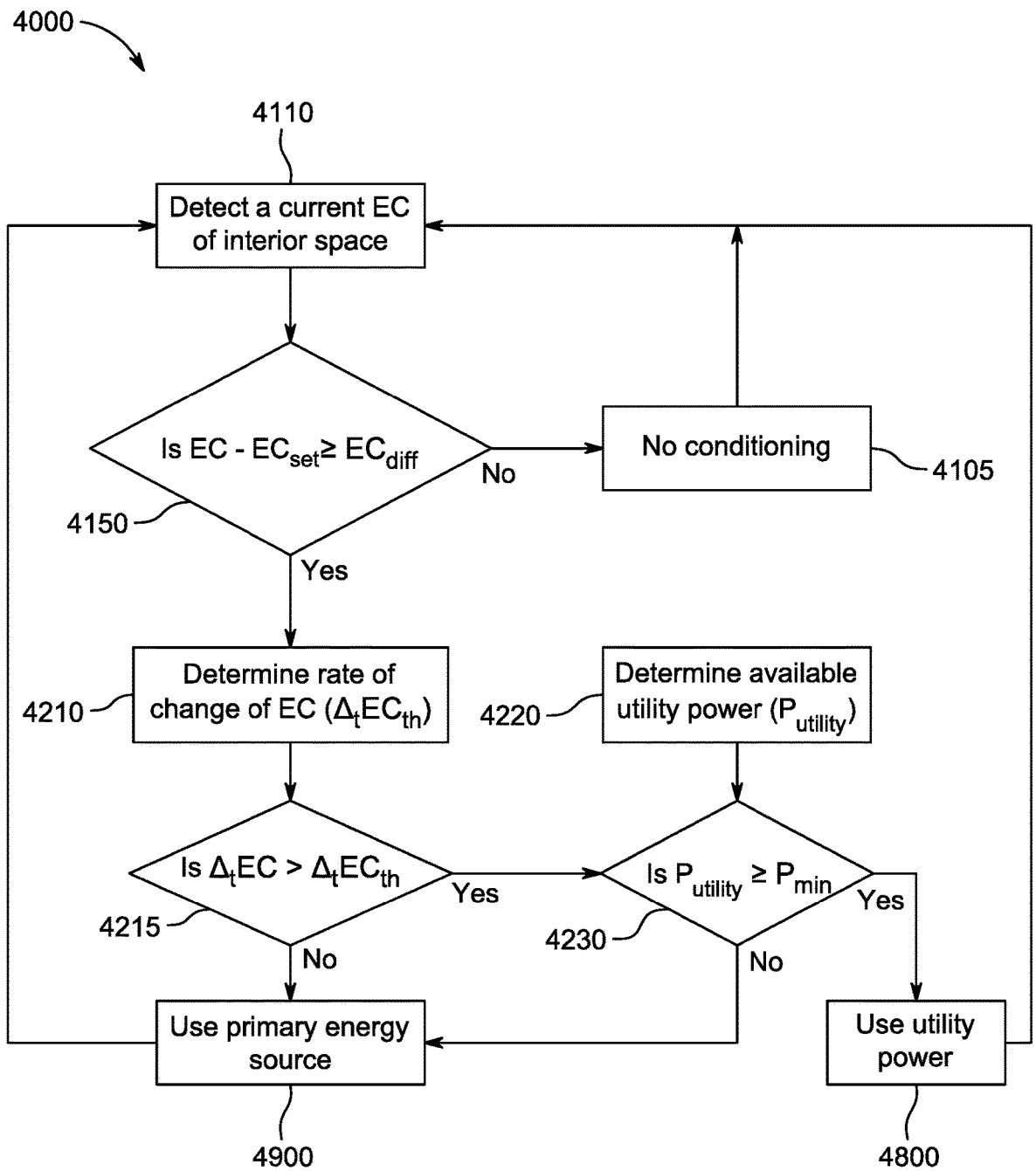
FIG. 7 illustrates a flowchart for a method of power management for a transport refrigeration system, according to one embodiment.

FIG. 7 is a flowchart for a method 4000 of power management for a TRS (e.g., the TRS 10). In an embodiment, the method 4000 of power management may be employed by the power management system 100 in FIG. 2 or the power management system 200 in FIG. 3.

At 4110, a TRS controller (e.g., the TRS controller 60, 140, 240) detects a current environmental condition (EC) of the internal space of a transport unit (e.g., transport unit 80). In an embodiment, 4110 is similar to 3110 as discussed above.

At 4150, the TRS controller determines if the internal space requires climate conditioning based on the current environmental condition (EC) and a desired environmental condition ($EC_{set}$). In an embodiment, the TRS controller can determine whether climate conditioning of the internal space is required when the difference between the current environmental condition and the desired environmental condition ($EC-EC_{set}$) is equal to or greater than a predetermined amount ($EC_{diff}$). In an embodiment, the predetermined amount ($EC_{diff}$) at 4150 may be similar to the predetermined amount ($EC_{diff}$) for 2150 in FIG. 5 as discussed above. If the difference ($EC-EC_{set}$) is equal to or greater than the predetermined amount ($EC_{diff}$), the method 4000 proceeds to 4210. If the difference is less than the predetermined amount ($EC_{diff}$), the method 4000 proceeds to 4105. In an embodiment, 4150 may be similar to 2150 as discussed above.

At 4105, the TRS is operated such that the TRU provides no climate conditioning to the internal space. This may be referred to as an off mode. In an embodiment, the TRU may not require a significant or substantial amount of power while operating in the off mode. The method 4000 then proceeds back to the 4110.

At 4210, the TRS controller determines the rate at which the environmental condition is changing. For example, the TRS may use a detected current environmental condition and one or more previously detected values for the environmental condition to determine the rate of change of the environmental condition ($\Delta_r EC$). The rate of change of the environmental condition may be used for maintaining an environment of the internal space at a steady state (e.g., change in environmental condition provided by climate conditioning is equal to the rate of loss of the environmental condition). In an embodiment, an environmental condition may change more quickly when the doors to the transport unit are opened, and/or goods are added to the transport unit. The method 4000 then proceeds to 4215.

At 4215, the TRS controller determines if rate of change of the environmental condition ($\Delta_r EC$) is greater than a threshold ($\Delta_r EC_{TH}$). The threshold ($\Delta EC_{TH}$) can be based on the maximum capacity of the TRU to change the environmental condition when operated using utility power. If the rate of change of the environmental condition (NEC) is equal to or less than the threshold ($\Delta_r EC_{TH}$), the method 4000 proceeds to 4230. If the rate of change of the environmental condition (NEC) is greater than the threshold ($\Delta_r EC_{TH}$), the method 4000 proceeds to 4900. It should be understood that 4210 may be incorporated into 4215 in an embodiment.

In an embodiment, the threshold ($\Delta EC_{TH}$) may also be based on the difference between the current environmental condition and a desired environmental condition (EC−EC$_{set}$). When empty, a transport unit may be environmentally conditioned (e.g., kept at ambient conditions). Accordingly, one or more environmental conditions may be significantly different from a desired environmental condition. Climate conditioning that is larger than the maximum capacity of the TRU when operated using utility power may be desired so that the internal space is quickly brought closer to the desired environmental condition(s). The threshold ($\Delta EC_{TH}$) may be configured to be modified based the difference between the current environmental condition and a desired environmental condition (EC−EC$_{set}$). In an embodiment, the threshold ($\Delta EC_{TH}$) may be modified so that the method 4000 proceeds to 4900 when the difference between the current environmental condition and a desired environmental condition (EC−EC$_{set}$) is greater than a second predetermined amount (EC$_{diff-2}$). The second predetermined amount (EC$_{diff-2}$) is greater than the predetermined amount (EC$_{diff}$) discussed at 4150. In another embodiment, the method 4000 may be configured to proceed directly from 4150 to 4900 when the difference (EC−EC$_{set}$) is larger than the second predetermined amount (EC$_{diff-2}$).

At 4220, the TRS controller determines the amount of utility power (P$_{utility}$) available to the TRS from a utility power source (e.g., utility power source 170, 270). In an embodiment, 4220 may be the same as 3220 discussed above. It should be appreciated that 4220 may be incorporated into 4230 in an embodiment. At 4230, the TRS controller determines if the amount of available utility power (P$_{utility}$) is greater than or equal to a minimum power (P$_{min}$). In an embodiment, the value for the minimum power (P$_{min}$) may be the same as discussed above for 3230. If the available utility power is greater than or equal to the minimum power, the method 4000 proceeds to 4800. If the available utility power is less than the minimum power, the method 4000 proceeds to 4900.

At 4800, the TRS controller operates the TRS to provide utility power to the TRU to climate condition the internal space. This may be referred to as a standby mode. In an embodiment, 4800 may be similar to 1800 as discussed above. The method 4000 then proceeds back to 4110.

At 4900, the TRS controller utilizes the primary energy source of the TRS to provide the power for the TRU to climate condition the internal space. This may be referred to as an internal energy mode. In an embodiment, 4900 may be similar to 1800 as discussed above. For example, 4900 may include operating the prime mover of the TRS (e.g., prime mover 120, 220) and/or utilizing a battery of the TRS (e.g., battery 180, 280) to provide the power to the TRU to climate condition the internal space as similarly discussed above regarding 1800. The method 4000 then proceeds back to 4110.

The method 4000 of power management operates the TRS using either a utility power source or a prime mover to account for the utility power source providing a limited amount of power, and the TRU having a more efficient limited capacity configuration when operated using utility power.

Figure 8:
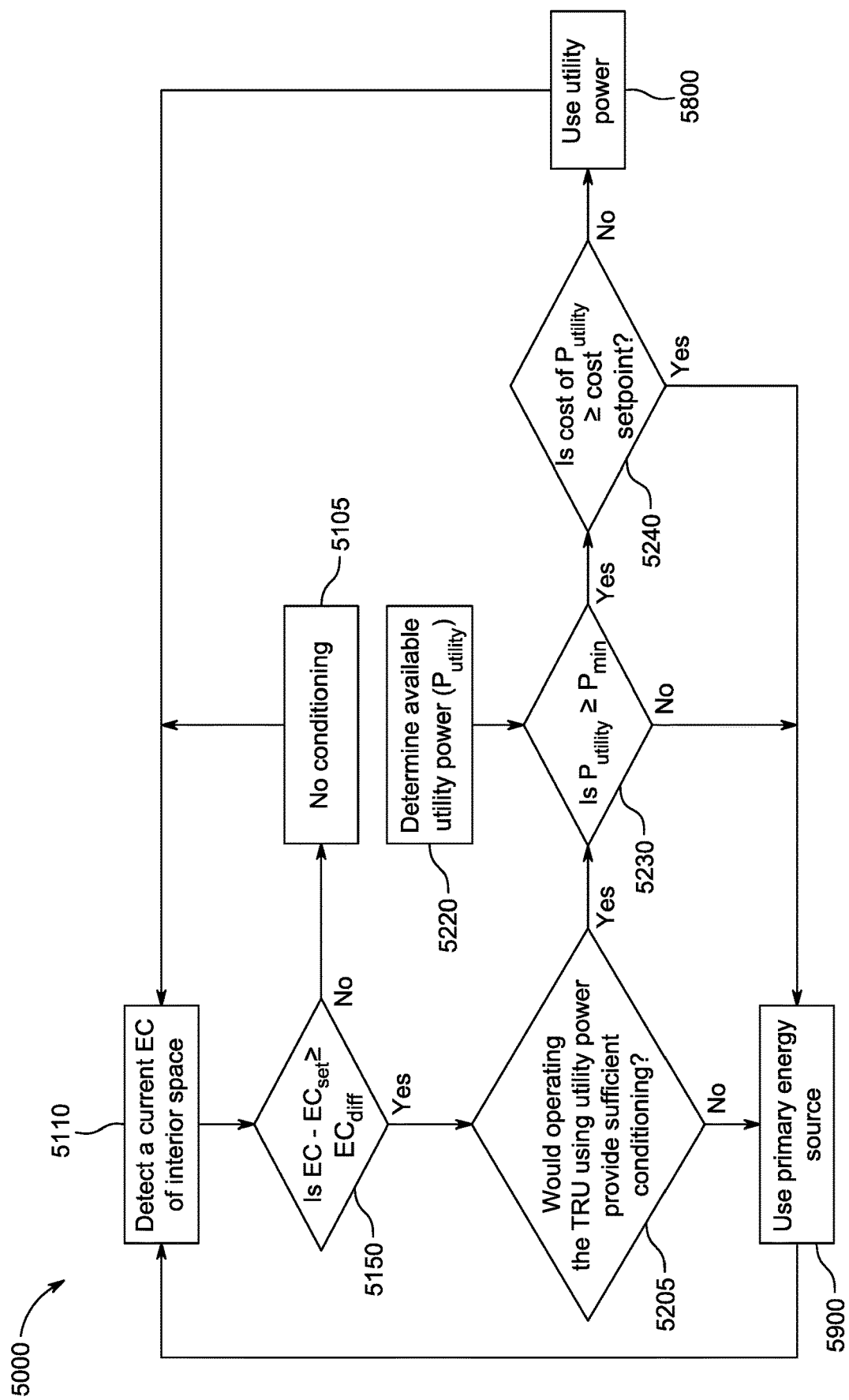
FIG. 8 illustrates a flowchart for a method of power management for a transport refrigeration system, according to one embodiment.

FIG. 8 is a flowchart for a method 5000 of power management for a TRS (e.g., the TRS 10). In an embodiment, the method 5000 of power management may be employed by the power management system 100 in FIG. 2 or the power management system 200 in FIG. 3.

At 5110, a TRS controller (e.g., the TRS controller 60, 140, 240) detects a current environmental condition (EC) of the internal space of a transport unit (e.g., transport unit 20). In an embodiment, 5110 is similar to 2110 as discussed above.

At 5150, the TRS controller determines if the internal space requires climate conditioning based on the detected current environmental condition (EC). In an embodiment, the TRS controller can determine that climate conditioning of the internal space is required when the difference between the current environmental condition and a desired environmental condition (EC−EC$_{set}$) is equal to or greater than a predetermined amount (EC$_{diff}$). In an embodiment, the predetermined amount (EC$_{diff}$) at 5150 may be similar to the predetermined amount (EC$_{diff}$) for 2150 in FIG. 5 as discussed above. If the difference (EC−EC$_{set}$) is larger than the predetermined amount (EC$_{diff}$), the method 5000 proceeds to 5205. If the difference is not larger than the predetermined amount (EC$_{diff}$), the method 5000 proceeds to 5105. In an embodiment, 4150 may be similar to 2150 as discussed above.

At 5105, the TRS is operated such that the TRU provides no climate conditioning to the internal space. This may be referred to as an off mode. In an embodiment, the TRU may not require a significant or substantial amount of power while operating in the off mode. The method 5000 then proceeds back to the 5110.

At 5205, the TRS controller determines if operating the TRU using utility power would provide sufficient climate conditioning to the internal space. In an embodiment, 5205 may be similar to 3205 as discussed above. In an embodiment, 5205 may determine if operating the TRU using utility power would provide sufficient climate conditioning based on the rate of change of the environmental condition in a similar manner as 4215 discussed above. If operating the TRU using utility power would provide sufficient climate conditioning, the method 5000 proceeds to 5230. If operating the TRU using utility power would not provide sufficient climate conditioning, the method 5000 proceeds to 5900.

At 5220, the TRS controller determines the amount of utility power (P$_{utility}$) available to the TRS from a utility power source (e.g., utility power source 170, 270). In an embodiment, 5220 may be the same as 3220 discussed above. It should be appreciated that 5220 may be incorporated into 5230 in an embodiment.

At 5230, the TRS controller determines if the amount of available utility power (P$_{utility}$) is greater than or equal to a minimum power (P$_{min}$). In an embodiment, the value for the minimum power (P$_{min}$) may be determined in the same manner as previously discussed regarding 3230. In an embodiment, 5230 may be the same as 3230 as discussed above. If the available utility power is greater than or equal to the minimum power, the method 5000 proceeds to 5240. If the available utility power is less than the minimum power, the method 5000 proceeds to 5900.

At 5240, the TRS controller determines if the cost for the available utility power is greater than a cost setpoint. The facility providing access to the utility power source (e.g., 170, 270) may charge a premium during times of higher power usage. For example, the higher power usage may be due to large number of transport units being located at the facility and requiring utility power. The TRS controller can communicate with the facility to determine the current cost for utility power. In another embodiment, the current cost may be provided by a local operator. In other embodiments, the current cost for utility power may be accessed by or provided to the TRS from a remote server or a remote operator. The cost setpoint may be based on one or more of a variety of factors. Factors for determining the predetermined amount may include, but are not limited to, the cost for operating the prime mover (e.g., gas or diesel cost, wear/depreciation of prime mover). If the current cost for utility power is greater than or equal to the cost setpoint, the method 5000 proceeds to 5400. If the current cost for utility power is less than the cost setpoint, the method 5000 proceeds to 5800.

At 5800, the TRS controller operates the TRS to provide utility power to the TRU to climate condition the internal space. This may be referred to as a standby mode. In an embodiment, 5800 may be similar to 1800 as discussed above. The method 5000 then proceeds back to 5110.

At 5900, the TRS controller utilizes the primary energy source of the TRS to provide power for the TRU to climate condition the internal space. This may be referred to as an internal energy mode. In an embodiment, 5900 may be similar to 1800 as discussed above. For example, 5900 may include operating the prime mover of the TRS (e.g., prime mover 120, 220) and/or utilizing a battery of the TRS (e.g., battery 180, 280) to provide the power to the TRU to climate condition the internal space as similarly discussed above regarding 1800. As shown in FIG. 8, the method 5000 does not operate the TRS in standby mode when the cost of utility power is equal to or greater than the cost setpoint. The method 5000 then proceeds back to 5110.

The method 5000 of power management operates the TRS using either a utility power source or a prime mover based on the cost of utility power and/or the amount of utility power available from utility power source. The method 5000 is able to account for the utility power source providing limited amounts of power and the cost of utility power. The method 5000 can also operate the TRU using the utility power in a limited capacity configuration that is more power efficient.

In an embodiment, a facility may charge a premium for the utility power provided by the utility power source instead of limiting the amount of utility power provided to each TRS. It should be appreciated that the method 5000 in FIG. 8 may be modified to exclude 5220 and 5230, when the method 5000 is employed, for example, in a facility that charges a premium instead of limiting the amount of utility power. In such an embodiment, if the TRS controller can determine that operating the TRU using utility power would provide sufficient climate conditioning at 5205, and the method 5000 would then proceed to 5240.

Figure 9:
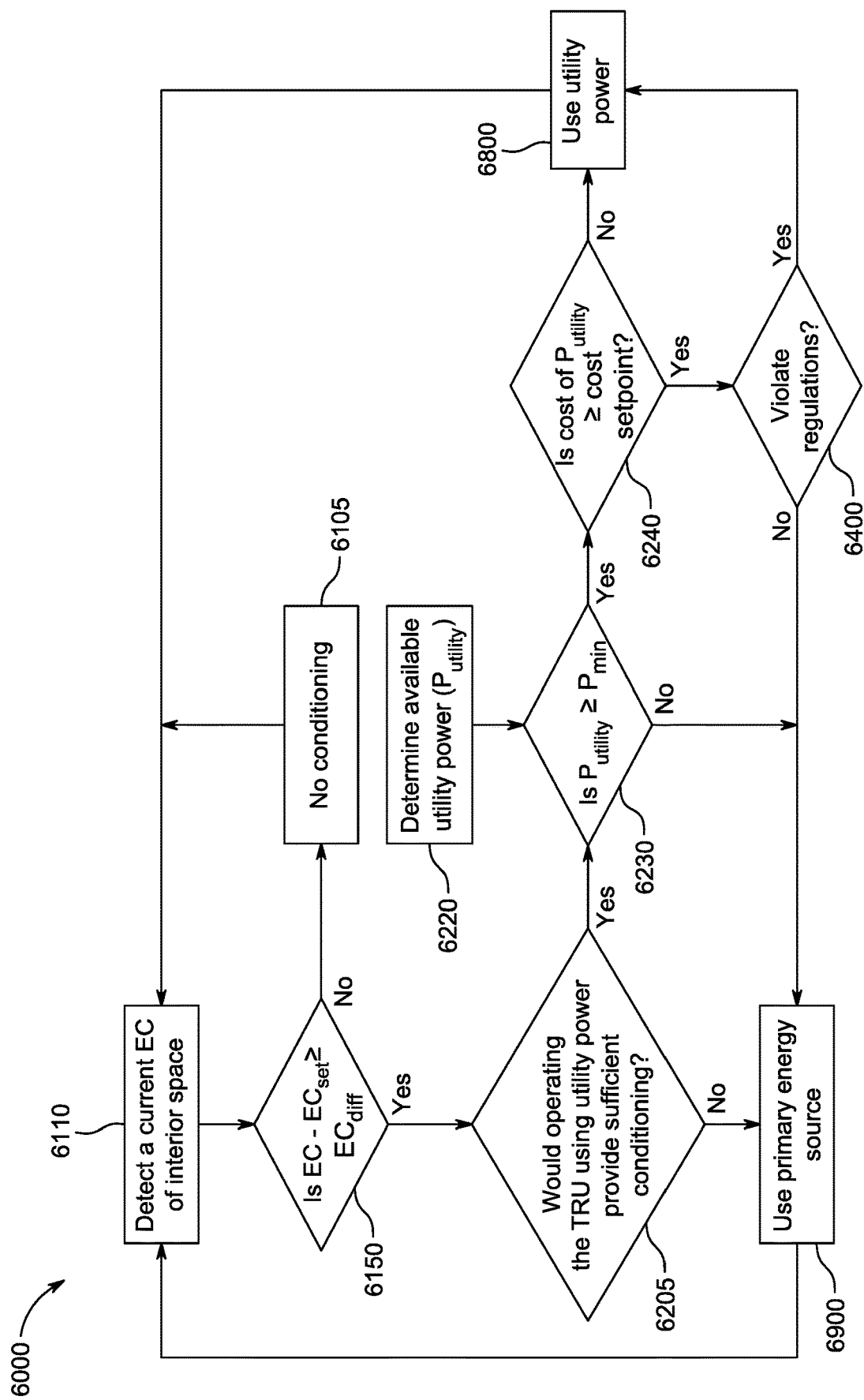
FIG. 9 illustrates a flowchart for a method of power management for a transport refrigeration system, according to one embodiment.

FIG. 9 is a flowchart for a method 6000 of power management for a TRS (e.g., the TRS 10). In an embodiment, the method 6000 of power management may be employed by the power management system 100 in FIG. 2 or the power management system 200 in FIG. 3.

At 6110, a TRS controller (e.g., the TRS controller 60, 140, 240) detects a current environmental condition (EC) of the internal space of a transport unit (e.g., transport unit 80). In an embodiment, 6110 is similar to 2110 as discussed above.

At 6150, the TRS controller determines if the internal space requires climate conditioning based on the detected current environmental condition (EC) and the desired environmental condition ($EC_{set}$). In an embodiment, the TRS controller can determine that climate conditioning of the internal space is required when the difference between the current environmental condition and a desired environmental condition ($EC-EC_{set}$) is greater than a predetermined amount ($EC_{diff}$). In an embodiment, the predetermined amount ($EC_{diff}$) at 6150 may be similar to the predetermined amount ($EC_{diff}$) for 2150 in FIG. 5 as discussed above. If the difference ($EC-EC_{set}$) is equal to or greater than the predetermined amount ($EC_{diff}$), the method 6000 proceeds to 6205. If the difference is not larger than the predetermined amount ($EC_{diff}$), the method 6000 proceeds to 6105.

At 6105, the TRS is operated such that the TRU provides no conditioning to the internal space. This may be referred to as an off mode. In an embodiment, the TRU may not require a significant or substantial amount of power while operating in the off mode. The method 6000 then proceeds back to the 6110.

At 6205, the TRS controller determines if operating the TRU using utility power would provide sufficient climate conditioning to the internal space. In another embodiment, 6205 may be similar to 4205 as discussed above. In an embodiment, 6205 may determine if operating the TRU using utility power would provide sufficient climate conditioning based on the rate of change of the environmental condition in a similar manner as 4215 as discussed above. If operating the TRU using utility power would provide sufficient climate conditioning, the method 6000 proceeds to 6230. If operating the TRU using utility power would not provide sufficient climate conditioning, the method 6000 proceeds to 6900.

At 6220, the TRS controller determines the amount of utility power ($P_{utility}$) available to the TRS from a utility power source (e.g., utility power source 170, 270). In an embodiment, 6220 may be the same as 3220 discussed above. It should be appreciated that 6220 may be incorporated into 6230 in an embodiment. At 6230, the TRS controller determines if the amount of available utility power ($P_{utility}$) is greater than or equal to a minimum power ($P_{min}$). In an embodiment, the value for the minimum power ($P_{min}$) may be determined in the same manner as previously discussed regarding 3230. If the available utility power is greater than or equal to the minimum power, the method 6000 proceeds to 6240. If the available utility power is less than the minimum power, the method 6000 proceeds to 6900.

At 6240, the TRS controller determines if the cost for the available utility power is equal to or greater than a cost setpoint. In an embodiment, the TRS controller may be configured to determine the current cost for the utility power 6240 in one of the ways discussed above for 5240. If the current cost for utility power is greater than or equal to the cost setpoint, the method 6000 proceeds to 6400. If the current cost for utility power is less than the cost setpoint, the method 6000 proceeds to 6800.

At 6400, the TRS controller determines if operating a prime mover (e.g., prime mover 120, 220) to generate power for the TRU to climate condition the internal space would violate any regulations. Specific geographic areas can have regulations for emissions and/or noise. For example, in the United States there can be federal regulations, state regulations, and city regulations for emissions or noise. Some cities have noise regulations for specific nighttime hours. Cities may have regulations for emissions during certain time periods to help prevent smog. For example, emission may be for limits on air pollutants generated by operating the prime mover such as, but not limited to, $SO_X$, $NO_X$, and $CO_2$. In an embodiment, the TRS controller can determines at 6400 if operating the prime mover to generate power would violate any of the emissions or noise regulations for the parked transport unit. If operating the prime mover would violate one or more of the emission or noise regulations, the method 6000 proceeds to 6800. If operating the prime mover would not violate any of the emission or noise regulations, the method 6000 proceeds to 6900. In an embodiment, the TRS controller at 6240 may consider just emission regulations.

At 6800, the TRS controller operates the TRS to provide utility power to the TRU to climate condition the internal space. This may be referred to as a standby mode. In an embodiment, 6800 may be similar to 1800 as discussed above. The method 6000 then proceeds back to 6110.

At 6900, the TRS controller utilizes the primary energy source of the TRS to provide the power for the TRU to climate condition the internal space. This may be referred to as an internal energy mode. In an embodiment, 6900 may be similar to 1800 as discussed above. For example, 6900 may include operating the prime mover of the TRS (e.g., prime mover 120, 220) and/or utilizing a battery of the TRS (e.g., battery 180, 280) to provide the power to the TRU to climate condition the internal space as similarly discussed above regarding 1800. The method 6000 then proceeds back to 6110.

The method 6000 of power management operates the TRS using either a utility power source or a prime mover to account for the utility power source providing limited amounts of power, the TRU having a more efficient limited capacity configuration when operated using the utility power, the cost for the shower power, and emission and/or noise regulations.

In an embodiment, a facility may charge a premium for the utility power provided by the utility power source instead of limiting the amount of utility power provided to each TRS. It should be appreciated that the method 6000 in FIG. 9 may be modified to exclude 6220 and 6230 as utility power would not be limited. Thus, in such an embodiment, if the TRS controller determines that operating the TRU using utility power would provide sufficient climate conditioning at 6205, the method 6000 would proceed to 6240.

Figure 10:
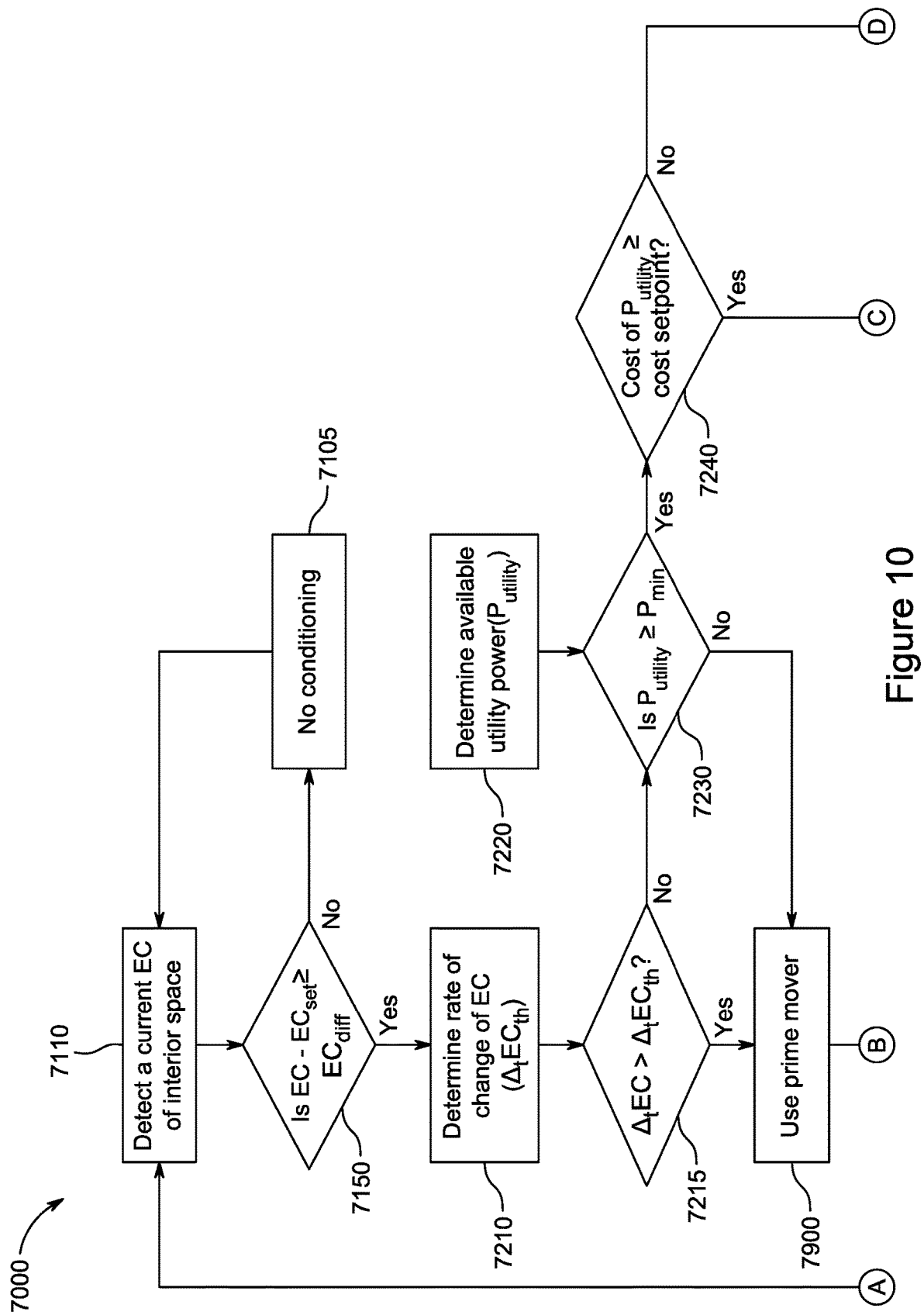
FIG. 10 illustrates a flowchart for a method of power management for a transport refrigeration system, according to one embodiment.
Figure 10:
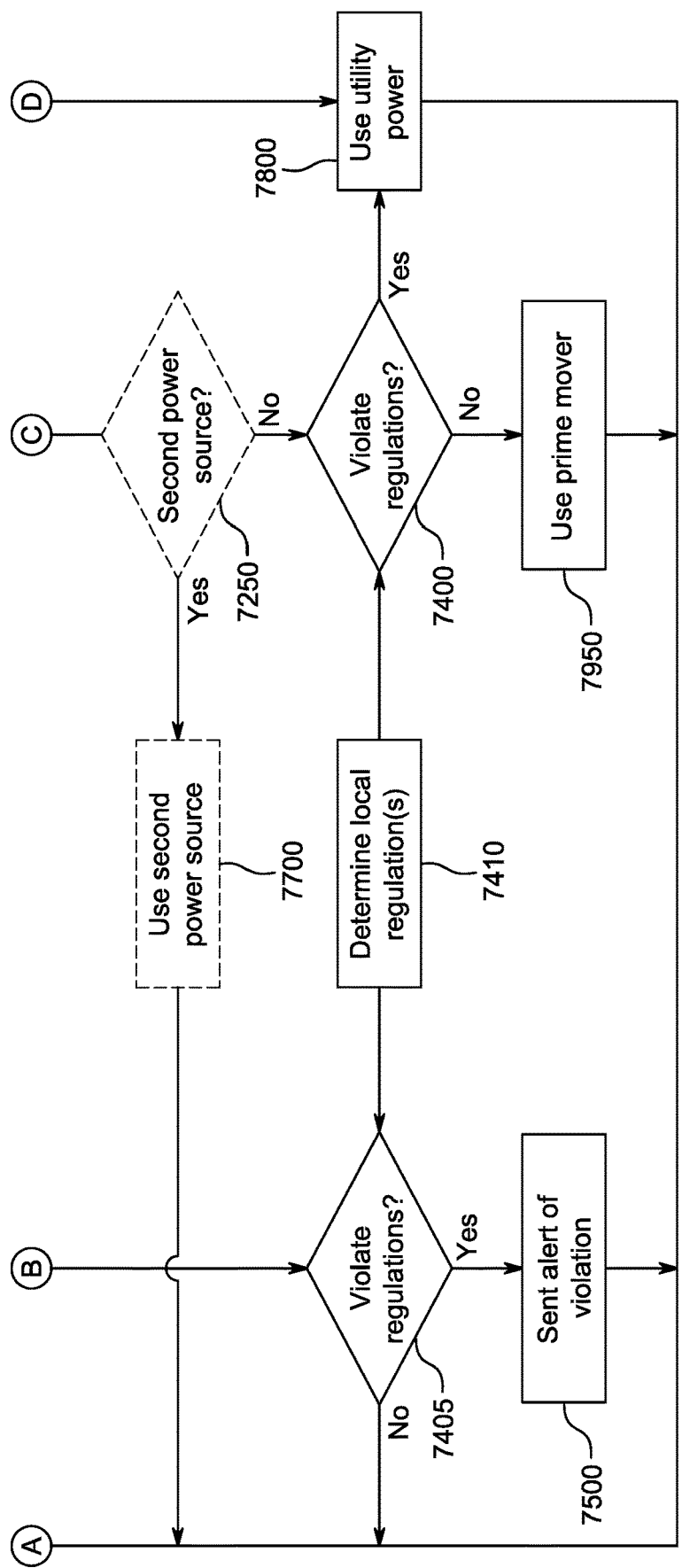

FIG. 10 is a flowchart for a method 7000 of power management for a TRS (e.g., the TRS 10). In an embodiment, the method 7000 of power management may be employed by the power management system 100 in FIG. 2 or the power management system 200 in FIG. 3.

At 7110, a TRS controller (e.g., the TRS controller 60, 140, 240) detects a current environmental condition (EC) of the internal space of a transport unit (e.g., transport unit 20). In an embodiment, 7110 is similar to 2110 as discussed above.

At 7150, the TRS controller determines if the internal space requires climate conditioning based on the detected current environmental condition (EC) and a desired environmental condition ($EC_{set}$). In an embodiment, the TRS controller can determine climate conditioning of the internal space is required when the difference between the current environmental condition and a desired environmental condition (EC−$EC_{set}$) is greater than a predetermined amount ($EC_{diff}$). In an embodiment, the predetermined amount ($EC_{diff}$) at 7150 may be similar to the predetermined amount ($EC_{diff}$) for 2150 in FIG. 5 as discussed above. If the difference (EC−$EC_{set}$) is equal to or larger than the predetermined amount ($EC_{diff}$), the method 7000 proceeds to 7210. If the difference is less than the predetermined amount ($EC_{diff}$), the method 7000 proceeds to 7105.

At 7105, the TRS is operated such that the TRU provides no conditioning to the internal space. This may be referred to as a off mode. In an embodiment, the TRU may not require a significant or substantial amount of power while operating in the off mode. The method 7000 then proceeds back to the 7110.

At 7210, the TRS controller determines the rate at which the environmental condition is changing ($\Delta_r EC$). In an embodiment, TRS controller at 7210 may determine the rate of change of the environmental condition ($\Delta_r EC$) by using multiple detected values for the environmental condition of the internal space as similarly discussed above for 4210.

At 7215, the TRS controller determines if rate of change of the environmental condition ($\Delta_r EC$) is greater than a threshold ($\Delta_r EC_{TH}$). In an embodiment, the threshold $\Delta_r EC_{TH}$ in 7215 may be determined in a similar manner as discussed for the threshold for 4215 in FIG. 7. If the rate of change of the environmental condition ($\Delta_r EC$) is greater than the threshold ($\Delta_r EC_{TH}$), the method 7000 proceeds to 7900. If rate of change of the environmental condition ($\Delta_r EC$) is equal to or less than threshold ($\Delta_r EC_{TH}$), the method 7000 proceeds to 7230.

At 7220, the TRS controller determines the amount of utility power ($P_{utility}$) available to the TRS from a utility power source (e.g., utility power source 170, 270). In an embodiment, 7220 may be the same as 3220 discussed above. It should be appreciated that 7220 may be incorporated into 7230 in an embodiment. At 7230, the TRS controller determines if the amount of available utility power ($P_{utility}$) is greater than or equal to a minimum power ($P_{min}$). In an embodiment, the value for the minimum power ($P_{min}$) may be determined in the same manner as previously discussed regarding 3230. If the available utility power is greater than or equal to the minimum power, the method 7000 proceeds to 7240. If the available utility power is less than the minimum power, the method 7000 proceeds to 7900.

At 7240, the TRS controller determines if the cost for the available utility power is equal to or greater than a cost setpoint. In an embodiment, the TRS controller may be configured to determine the current cost for the utility power in 7240 in one of the ways discussed above for 5240. If the current cost for utility power is equal to or greater than the cost setpoint, the method 7000 proceeds to 7250. If the current cost for utility power is less than the cost setpoint, the method 7000 proceeds to 7800.

At 7250, the TRS controller determines if a second power source is available to provide power to the TRU. When the method includes 7250, the primary power source of the power management system would include both a primary mover and the second power source. For example, the second power source could be a battery (e.g., battery 180, 280). The battery may be part of a hybrid power system as discussed above. In such an embodiment, the primary power source for the TRS includes both the prime mover and the battery. In an embodiment, the TRS controller may determine that a second power source is able to provide power based on if the amount of power that can be supplied by the second power source is equal to or greater than the minimum power ($P_{Alt} \geq P_{min}$). The minimum power ($P_{min}$) may be the same as discussed above for 7230. If the TRS controller determines that the second power source is able to provide power, the method 7000 proceeds to 7700. If the TRS controller determines that the second power source is unable to provide power, the method 7000 proceeds to 7400.

At 7700, the TRS controller operates the TRS to provide power from the second power source to the TRU to climate condition the internal space. This may be referred to as a secondary power mode. The method 7000 then proceeds back to 7110.

In an embodiment, the TRS may not include an second power source that is able to provide power for operating the TRU. In such an embodiment, when the TRS controller determines that the cost of utility power is equal to or greater than the cost setpoint, the method 7000 would proceed from 7240 to 7400.

At 7410, the TRS controller determines the regulations applicable to the operation of the prime mover (e.g., prime mover 120, 220). As discussed above regarding 6400 in FIG. 9, there may be one or more emission or noise regulations that apply to operating a prime mover. The TRS controller may determine the applicable emission or noise regulations by utilizing a location of the transport unit and information stored in the memory of the TRS controller (e.g., memory 148) regarding emission and/or noise regulations for specific regions. In an embodiment, the TRS controller may utilize a GPS device (e.g., GPS device 195, 295) to determine location of the transport unit. In another embodiment, the TRS controller may communicate with the facility that provides access to the utility power source to determine the location of the transport unit. In another embodiment, the location may be provided to the TRS by a local operator. The determined applicable regulations may be used in 7400 and 7405. It should be appreciated that 7410 may be incorporated into 7400 and 7405 in an embodiment.

At 7400, the TRS controller determines if operating a prime mover (e.g., prime mover 120, 220) to generate power for the TRU to climate condition the internal space would violate any applicable regulations. In an embodiment, the regulations may be one or more emission or noise regulations. In an embodiment, the TRS controller at 7400 may determine if any regulations are violated in a similar manner as discussed above regarding 6400. If operating the prime mover would violate one or more of the emission or noise regulations, the method 7000 proceeds to 7800. If operating the prime mover would not violate any of the emission or noise regulations, the method 7000 proceeds to 7950. In an embodiment, the TRS controller at 7400 and/or 7405 may consider just emission regulations. In another embodiment, the TRS controller at 7400 and/or 7405 may consider just noise regulations.

At 7800, the TRS controller operates the TRS to provide utility power to the TRU to climate condition the internal space. This may be referred to as a standby mode. In an embodiment, 7800 may be similar to 1800 as discussed above. The method 7000 then proceeds back to 7110. At 7950, the prime mover is operated to generate the power for the TRU to climate condition the internal space. This may be referred to as a prime mover mode. As shown in FIG. 10, the method 7000 does not operate the TRS in standby mode when the cost of utility power is equal to or greater than the cost setpoint and operating in prime mover mode will not violate any regulations. In an embodiment, operating the prime mover to generate power allows the TRU to provide a maximum amount of climate conditioning. The method 7000 then proceeds back to 7110.

At 7900, the prime mover is operated to generate the power for the TRU to climate condition the internal space similar to 7950. The method 7000 then proceeds to 7405. At 7405, the TRS controller determines if the operation of the prime mover (e.g., prime mover 120, 220) violates any of the applicable regulations. In an embodiment, the regulations may be one or more emission or noise regulations. In an embodiment, the TRS controller at 7405 may determine if any regulations are being violated in a similar manner as discussed above regarding 6400 or 7400. If the prime mover is violating one or more of the emission or noise regulations, the method 7000 proceeds to 7500. If the prime mover is not violating any of the emission or noise regulations, the method 7000 proceeds back to 7110. In an embodiment, the TRS controller at 7405 may consider just emission regulations.

At 7500, the TRS controller sends an alert that the prime mover is operating and violating one or more regulations. In an embodiment, the TRS controller may send the alert to a remote facility or server (not shown). In another embodiment, the TRS controller may send the alert to a local operator. In another embodiment, the TRS controller may send the alert to the facility that provides access to the utility power source.

The method of power management 7000 operates the TRS using either a utility power source or a prime mover to account for the utility power source providing limited amounts of power, the TRU having a more efficient limited capacity configuration when operated using the utility power, the cost for the shower power, and emission and/or noise regulations.

In an embodiment, a facility may charge a premium for the utility power provided by the utility power source instead of limiting the amount of utility power provided to each TRS. It should be appreciated that the method 7000 may be modified to exclude 7220 and 7230 as amount of utility power would not be limited. Thus, in such an embodiment, if the TRS controller determines that the rate of change of the environmental condition ($\Delta_r EC$) is equal to or less than threshold ($\Delta_r EC_{TH}$), the method 7000 would proceed to 7240.

The method 7000 considers a prime mover and a second power source. It should be appreciated that the methods 1000, 2000, 3000, 4000, 5000, 6000 may be modified so that the internal power mode may utilize the prime mover or the second power source. In such an embodiment, the method 1000, 2000, 3000, 4000, 5000, and/or 6000 may include 7250 and/or 7770. For example, the internal energy mode in 1000, 2000, 3000, 4000, 5000, and/or 6000 in an embodiment may include 7250 and/or 7770. It should also be appreciated that a method of power management for a TRS in an embodiment may include one or more features from one or more of the methods 1000, 2000, 3000, 4000, 5000, 6000, 7000 as discussed above.

As discussed above, the TRS controller may be connected to or include a telematics unit (e.g., telematics unit 185, 285) that communicates with a remote electronic device (e.g., remote electronic device 187, 287). It should be appreciated that one or more or all of the determinations in the methods 1000, 2000, 3000, 4000, 5000, 6000 discussed as being performed by the TRS controller may be performed by the remote electronic device in an embodiment. In such an embodiment, the remote electronic device may then communicate instructions to the TRS controller to operate in the corresponding manner. For example, the instructions may instruct the TRS controller to operate in a particular mode (e.g., standby mode, internal energy mode, off mode, etc.). The operation of the TRS can be controlled remotely in such an embodiment. For example, cloud computing may be utilized to operate the TRS and its TRU.

Aspects:

Any of aspects 1-8 can be combined with any of aspects 8-17.

Aspect 1. A method for power management of a transport refrigeration system electrically connected to a utility power source, the transport refrigeration system including a transport refrigeration unit to climate condition an internal space of a transport unit, the method comprising:

determining climate conditioning for the internal space based on an environmental condition of the internal space and a desired environmental condition;

determining an operating mode for the transport refrigeration system from a plurality of operating modes based on one or more of an amount of utility power available from the utility power source to the transport refrigeration system, a current cost of the utility power, and a noise or emission regulation for operating a prime mover, the plurality of operating modes including:

an internal energy mode that includes utilizing a primary energy source to provide power to the transport refrigeration unit to climate condition the internal space, and a standby mode that includes supplying the utility power from the utility power source to the transport refrigeration unit to climate condition the internal space; and operating the transport refrigeration system in the determined operating mode.

Aspect 2. The method of aspect 1, wherein the primary energy source includes a prime mover, and the internal energy mode includes operating the prime mover to generate the power for the transport refrigeration unit to climate condition the internal space.

Aspect 3. The method of aspect of either one of aspects 1 or 2, further comprising:

detecting the environmental condition of the internal space; and determining a rate of change of the environmental condition based on multiple detected values for the environmental condition of the internal space, wherein determining the operating mode for the transport refrigeration system includes comparing the determined rate of change of the environmental condition to a threshold, and the transport refrigeration system is operated in the internal energy mode when the rate of change of the environmental condition is greater than the threshold.

Aspect 4. The method of aspect 2, wherein the threshold is a maximum rate that the transport refrigeration unit changes the environmental condition when climate conditioning the internal space in the standby mode.

Aspect 5. The method of any one of aspects 1-4, further comprising:

determining the amount of the utility power available from the utility power source; and determining a minimum power required by the transport refrigeration unit to provide the climate conditioning for the internal space while operating in the standby mode, wherein determining the operating mode for the transport refrigeration system includes comparing the amount of the utility power available from the utility power source and the minimum power, and the transport refrigeration system is operated in the internal energy mode when the minimum power is greater than the amount of utility power available from the utility power source.

Aspect 6. The method of any one of aspects 1-5, further comprising:

determining the current cost of the utility power, wherein determining the operating mode for the transport refrigeration system includes comparing the current cost of the utility power and a cost setpoint, and the transport refrigeration system is not operated in the standby mode when the current cost of utility power is greater than the cost setpoint.

Aspect 7. The method of aspect 6, further comprising:

determining the emission or noise regulations for operating the prime mover based on a location of the transport unit, wherein the transport refrigeration system is operated in the internal energy mode when the current cost of the utility power is greater than the cost setpoint and operating the TRS in the internal energy mode does not violate the noise or emissions regulation.

Aspect 8. The method of any one of aspects 1-7, wherein the plurality of operating modes includes a off mode in which the transport refrigeration unit is configured not to provide climate conditioning to the internal space, and the transport refrigeration system is operated in the off mode when a difference between the environmental condition and the desired environmental condition is less than a predetermined amount.

Aspect 9. A transport refrigeration system for providing climate control to an internal space of a transport unit, the transport refrigeration system comprising:

a transport refrigeration unit for providing climate conditioning to the internal space of the transport unit, wherein the transport refrigeration unit is powered by one of a utility power source and a primary engine source; and a controller configured to:

determine climate conditioning for the internal space based on an environmental condition of the internal space and a desired environmental condition, determine an operating mode for the transport refrigeration system from a plurality of operating modes based on one or more of an amount of utility power available from the utility power source to the transport refrigeration system, a current cost of the utility power, and a noise or emission regulation for operating the primary energy source, and operate the transport refrigeration system in the determined operating mode, wherein the plurality of operating modes includes:

an internal energy mode that includes utilizing the primary energy source to provide power for the transport refrigeration unit to climate condition the internal space, and a standby mode that includes supplying utility power from the utility power source to the transport refrigeration unit to climate condition the internal space.

Aspect 10. The transport refrigeration system of aspect 9, wherein the primary energy source includes a prime mover, and the internal energy mode includes operating the prime mover to generate power for the transport unit to climate condition the internal space.

Aspect 11. The transport refrigeration system of aspect 10, wherein the prime mover is disposed in or on one of the transport unit and the transport refrigeration unit.

Aspect 12. The transport refrigeration system of any one of aspects 9-11, further comprising:

a sensor that detects the environmental condition of the internal space, wherein the controller is configured to determine a rate of change of the environmental condition based on multiple detected values for the environmental condition of the internal space, wherein the controller is configured to determine the operating mode for the transport refrigeration system by comparing the determined rate of change of the environmental condition to a threshold, and to operate the transport refrigeration system in the internal energy mode when the rate of change of the environmental condition is greater than the threshold.

Aspect 13. The transport refrigeration system of aspect 12, wherein the threshold is a maximum rate that the transport refrigeration unit changes the environmental condition when climate conditioning the internal space in the standby mode.

Aspect 14. The transport refrigeration system of any one of aspects 9-13,
wherein the controller is configured to determine the amount of utility power available from the utility power source, and to determine a minimum power required by the transport refrigeration unit to climate condition the internal space while operating in the standby mode, and
wherein the controller is configured to operate the transport refrigeration system in the internal energy mode when the minimum power is greater than the amount of utility power available from the utility power source.

Aspect 15. The transport refrigeration system of any one of aspects 9-14,
wherein the controller is configured to determine the current cost of the utility power, and to compare the cost of the utility power to a cost setpoint, and
wherein the controller is configured to not operate the transport refrigeration system in the standby mode when the current cost of utility power is greater than the cost setpoint.

Aspect 16. The transport refrigeration system of aspect 15,
wherein the controller is configured to determine one or more emission or noise regulations for operating a prime mover based on a location of the transport unit, and
wherein the controller is configured to operate the transport refrigeration system in the internal energy mode when the current cost of the utility power is greater than the cost setpoint and operating the TRS in the internal energy mode does not violate the emission or noise regulation.

Aspect 17. The transport refrigeration system of any one of aspects 9-16, further comprising:
a sensor that detects the environmental condition of the internal space,
wherein the plurality of operating modes includes an off mode in which the controller is configured to operate the transport refrigeration unit to not provide climate conditioning to the internal space, and
wherein the controller is configured to operate the transport refrigeration system in the off mode when a difference between the environmental condition detected by the sensor and the desired environmental condition is less than a predetermined amount.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for power management of a transport refrigeration system electrically connected to a utility power source, the transport refrigeration system including a transport refrigeration unit to climate condition an internal space of a transport unit, the method comprising:
determining climate conditioning for the internal space based on an environmental condition of the internal space and a desired environmental condition;
determining an amount of utility power available from the utility power source to the transport refrigeration system;
determining an operating mode for the transport refrigeration system from a plurality of operating modes based on the amount of utility power available from the utility power source to the transport refrigeration system, the plurality of operating modes including:
an internal energy mode that includes utilizing a primary energy source to provide power to the transport refrigeration unit to climate condition the internal space, and
a standby mode that includes supplying the utility power from the utility power source to the transport refrigeration unit to climate condition the internal space; and
operating the transport refrigeration system in the determined operating mode.

2. The method of claim 1, wherein the primary energy source includes a prime mover, and the internal energy mode includes operating the prime mover to generate the power for the transport refrigeration unit to climate condition the internal space.

3. A method for power management of a transport refrigeration system electrically connected to a utility power source, the transport refrigeration system including a transport refrigeration unit to climate condition an internal space of a transport unit, the method comprising:
detecting an environmental condition of the internal space;
determining climate conditioning for the internal space based on an environmental condition of the internal space and a desired environmental condition;
determining a rate of change of the environmental condition based on multiple detected values for the environmental condition of the internal space;
determining an operating mode for the transport refrigeration system from a plurality of operating modes based on one or more of an amount of utility power available from the utility power source to the transport refrigeration system, a current cost of the utility power, and a noise or emission regulation for operating a prime mover, the plurality of operating modes including:
an internal energy mode that includes utilizing a primary energy source to provide power to the transport refrigeration unit to climate condition the internal space, and
a standby mode that includes supplying the utility power from the utility power source to the transport refrigeration unit to climate condition the internal space; and
operating the transport refrigeration system in the determined operating mode,
wherein determining the operating mode for the transport refrigeration system includes comparing the determined rate of change of the environmental condition to a threshold, and the transport refrigeration system is operated in the internal energy mode when the rate of change of the environmental condition is greater than the threshold.

4. The method of claim 3, wherein the threshold is a maximum rate that the transport refrigeration unit changes the environmental condition when climate conditioning the internal space in the standby mode.

5. The method of claim 1, further comprising:
determining a minimum power required by the transport refrigeration unit to provide the climate conditioning for the internal space while operating in the standby mode,
wherein determining the operating mode for the transport refrigeration system includes comparing the amount of the utility power available from the utility power source and the minimum power, and the transport refrigeration system is operated in the internal energy mode when the minimum power is greater than the amount of utility power available from the utility power source.

6. The method of claim 1, further comprising:
determining a current cost of the utility power,
wherein determining the operating mode for the transport refrigeration system includes comparing the current cost of the utility power and a cost setpoint, and the transport refrigeration system is not operated in the standby mode when the current cost of utility power is greater than the cost setpoint.

7. The method of claim 6, further comprising:
determining one or more noise or emission regulations for operating the prime mover based on a location of the transport unit,
wherein the transport refrigeration system is operated in the internal energy mode when the current cost of the utility power is greater than the cost setpoint and operating the TRS in the internal energy mode does not violate the one or more noise or emission regulations.

8. The method of claim 1, wherein the plurality of operating modes includes an off mode in which the transport refrigeration unit is configured not to provide climate conditioning to the internal space, and the transport refrigeration system is operated in the off mode when a difference between the environmental condition and the desired environmental condition is less than a predetermined amount.

9. A transport refrigeration system for providing climate control to an internal space of a transport unit, the transport refrigeration system comprising:
a transport refrigeration unit for providing climate conditioning to the internal space of the transport unit, wherein the transport refrigeration unit is powered by one of a utility power source and a primary engine source; and
a controller configured to:
determine climate conditioning for the internal space based on an environmental condition of the internal space and a desired environmental condition,
determine an amount of utility power available from the utility power source to the transport refrigeration system;
determine, when the transport refrigeration system is electrically connected to the utility power source, an operating mode for the transport refrigeration system from a plurality of operating modes based on the amount of utility power available from the utility power source to the transport refrigeration system, and
operate the transport refrigeration system in the determined operating mode, wherein the plurality of operating modes include:
an internal energy mode that includes utilizing the primary energy source to provide power for the transport refrigeration unit to climate condition the internal space, and
a standby mode that includes supplying utility power from the utility power source to the transport refrigeration unit to climate condition the internal space.

10. The transport refrigeration system of claim 9, wherein the primary energy source includes a prime mover, and the internal energy mode includes operating the prime mover to generate power for the transport unit to climate condition the internal space.

11. The transport refrigeration system of claim 10, wherein the prime mover is disposed in or on one of the transport unit and the transport refrigeration unit.

12. The transport refrigeration system of claim 9, further comprising:
a sensor that detects the environmental condition of the internal space,
wherein the controller is configured to determine a rate of change of the environmental condition based on multiple detected values for the environmental condition of the internal space,
wherein the controller is configured to determine the operating mode for the transport refrigeration system by comparing the determined rate of change of the environmental condition to a threshold, and to operate the transport refrigeration system in the internal energy mode when the rate of change of the environmental condition is greater than the threshold.

13. The transport refrigeration system of claim 12, wherein the threshold is a maximum rate that the transport refrigeration unit changes the environmental condition when climate conditioning the internal space in the standby mode.

14. The transport refrigeration system of claim 9,
wherein the controller is configured to determine a minimum power required by the transport refrigeration unit to climate condition the internal space while operating in the standby mode, and
wherein the controller is configured to operate the transport refrigeration system in the internal energy mode when the minimum power is greater than the amount of utility power available from the utility power source.

15. The transport refrigeration system of claim 9,
wherein the controller is configured to determine a current cost of the utility power, and to compare the cost of the utility power to a cost setpoint, and
wherein the controller is configured to not operate the transport refrigeration system in the standby mode when the current cost of utility power is greater than the cost setpoint.

16. The transport refrigeration system of claim 15,
wherein the controller is configured to determine one or more noise or emission regulations for operating a prime mover based on a location of the transport unit, and
wherein the controller is configured to operate the transport refrigeration system in the prime mover mode when the current cost of the utility power is greater than the cost setpoint and operating the TRS in the internal energy mode does not violate the one or more noise or emission regulations.

17. The transport refrigeration system of claim 9, further comprising:
a sensor that detects the environmental condition of the internal space, wherein the plurality of operating modes includes an off mode in which the controller is configured to operate the transport refrigeration unit to not provide climate conditioning to the internal space, and wherein the controller is configured to operate the transport refrigeration system in the off mode when a difference between the environmental condition detected by the sensor and the desired environmental condition is less than a predetermined amount.

18. The method of claim 1, wherein the amount of the utility power available from the utility power source to the transport refrigeration system is determined utilizing a telematics unit of the transport refrigeration system.

* * * * *